United States Patent
Chung

(10) Patent No.: US 10,622,840 B2
(45) Date of Patent: Apr. 14, 2020

(54) ELECTRONIC DEVICE FOR RECEIVING POWER WIRELESSLY AND METHOD FOR CONTROLLING THE ELECTRONIC DEVICE

(71) Applicant: Samsung Electronics Co., Ltd., Gyeonggi-do (KR)

(72) Inventor: Myung-Kyoon Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 4 days.

(21) Appl. No.: 15/839,208

(22) Filed: Dec. 12, 2017

(65) Prior Publication Data

US 2018/0166922 A1    Jun. 14, 2018

(30) Foreign Application Priority Data

Dec. 12, 2016 (KR) .......................... 10-2016-0168741

(51) Int. Cl.

| | |
|---|---|
| *H02J 50/12* | (2016.01) |
| *H02J 50/40* | (2016.01) |
| *H02J 7/02* | (2016.01) |
| *H02J 50/80* | (2016.01) |
| *H02J 50/60* | (2016.01) |
| *H04M 1/725* | (2006.01) |
| *H02J 50/90* | (2016.01) |

(52) U.S. Cl.
CPC .............. *H02J 50/12* (2016.02); *H02J 7/025* (2013.01); *H02J 50/40* (2016.02); *H02J 50/60* (2016.02); *H02J 50/80* (2016.02); *H02J 50/90* (2016.02); *H04M 1/72569* (2013.01)

(58) Field of Classification Search
None
See application file for complete search history.

(56) References Cited

U.S. PATENT DOCUMENTS

| | | | | |
|---|---|---|---|---|
| 2009/0096413 | A1* | 4/2009 | Partovi | .................... H01F 5/003 |
| | | | | 320/108 |
| 2010/0244576 | A1* | 9/2010 | Hillan | .................. G06K 7/0008 |
| | | | | 307/104 |
| 2011/0279244 | A1 | 11/2011 | Park et al. | |
| 2012/0115549 | A1 | 5/2012 | Kim et al. | |
| 2016/0301259 | A1* | 10/2016 | Zeine | ...................... H02J 50/80 |

FOREIGN PATENT DOCUMENTS

| | | |
|---|---|---|
| KR | 100806562 | 2/2008 |
| KR | 1020110125755 | 11/2011 |
| KR | 1020120049588 | 5/2012 |

\* cited by examiner

*Primary Examiner* — Jianxun Yang
(74) *Attorney, Agent, or Firm* — The Farrell Law Firm, P.C.

(57) ABSTRACT

An electronic device and method thereof for receiving power wirelessly are provided. The electronic device includes a sensor for detecting movement of the electronic device, a coil for receiving power wirelessly, a rectifier for rectifying the power received from the coil, a converter for converting a voltage of the rectified power to an output voltage, a power management integrated circuit (PMIC) for charging a battery of the electronic device or supplying consumption power to at least one hardware component of the electronic device, using the converted power, and a processor for controlling a parameter for at least one of the rectifier or the PMIC, based on the movement of the electronic device.

19 Claims, 18 Drawing Sheets

ELECTRONIC DEVICE FOR RECEIVING POWER WIRELESSLY AND METHOD FOR CONTROLLING THE ELECTRONIC DEVICE

PRIORITY

This application claims priority under 35 U.S.C. § 119(a) to Korean Patent Application Serial No. 10-2016-0168741, which was filed in the Korean Intellectual Property Office on Dec. 12, 2016, the entire disclosure of which is incorporated herein by reference.

BACKGROUND

1. Field of the Disclosure

The present disclosure relates generally to an electronic device for receiving power wirelessly, and a method for controlling the electronic device.

2. Description of the Related Art

Mobile devices, such as a portable phone or a personal digital assistant (PDA), are operated by rechargeable batteries. To charge a battery, electrical energy is supplied to the battery of the mobile device from a separate charger. In general, the charger and the battery each are provided with a contact terminal at the exterior, and are electrically connected to each other via the contact terminals.

In a contact charging scheme, however, the protrusion of the contact terminals make the contact terminals vulnerable to contamination caused by foreign materials which may result in unreliable charging of the battery. Further, when the contact terminals are exposed to moisture, the battery may not be able to be charged.

To overcome these types of problems, wireless charging technology or contactless charging technology has been developed.

The wireless charging technology provides wireless power transmission and reception. For example, the battery of a portable phone may be charged by placing the portable phone on a charging pad, without connecting the portable phone to a charging connector. Common examples of wireless charging technology area wireless electric toothbrush and a wireless electric shaver.

Wireless charging technology offers benefits of increased waterproofness, and increased portability by removing the need for a wired charger.

Further, it is expected that improvements in technologies related to wireless charging will be developed in the upcoming era of electric vehicles.

Three common wireless charging schemes are coil-based electromagnetic induction, resonance, and radio frequency (RF)/microwave radiation in which electrical energy is converted to microwaves.

However, compared to existing wired charging, wireless charging is still unreliable. For example, communication may be disconnected between a wireless power transmitter and a wireless power receiver, or charging may be discontinued due to a detection error during wireless charging.

SUMMARY

The present disclosure is made to address at least the above-mentioned problems and/or disadvantages and to provide at least the advantages described below.

Accordingly, an aspect of the present disclosure is to provide an electronic device for reliably performing wireless charging by adjusting various parameters of a wireless power reception circuit, a built-in power management integrated circuit (PMIC), or a charger based on movement of the electronic device, and a method for controlling the electronic device.

In accordance with an aspect of the present disclosure, an electronic device is provided, which includes a sensor configured to detect movement of the electronic device; a coil configured to receive power wirelessly; a rectifier configured to rectify the power received from the coil; a converter configured to convert a voltage from the rectified power to a predetermined output voltage; a power management integrated circuit (PMIC) configured to charge a battery of the electronic device or supply power to at least one hardware component of the electronic device, using the converted power; and a processor configured to control a parameter for at least one of the rectifier or the PMIC, based on a movement of the electronic device. In accordance with another aspect of the present disclosure, a method is provided for controlling an electronic device. The method includes detecting movement of the electronic device; receiving power wirelessly; rectifying the power by a rectifier; converting a voltage of the rectified power to a predetermined output voltage; charging a battery of the electronic device or supplying power to at least one hardware component of the electronic device, using the converted power by a power management integrated circuit (PMIC); and controlling a parameter for at least one of the rectifier or the PMIC, based on the movement of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
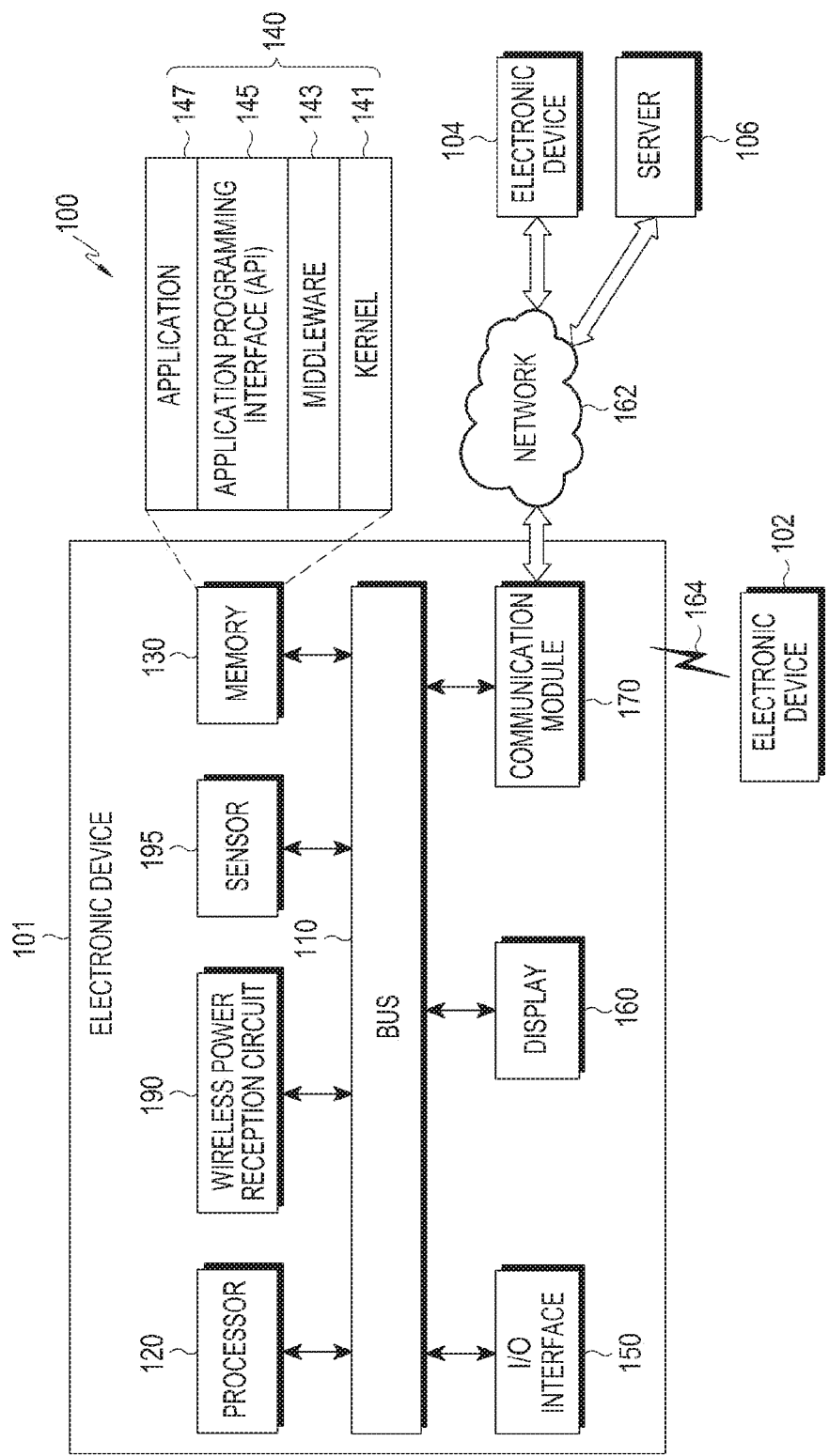
FIG. 1 illustrates an electronic device and a network according to an embodiment of the present disclosure.

Various embodiments of the present disclosure are described below with reference to the accompanying drawings.

The terms used herein are not intended to limit technologies described in the present disclosure to the particular embodiments, but instead, the present disclosure covers various modifications, equivalents, and/or alternatives to the described embodiments.

In the drawings, like reference numerals may denote the same components. Unless otherwise specified, singular expressions may include plural referents. Herein, the terms 'A or B' and 'at least one of A and/or B' may cover all possible combinations of enumerated items.

Numerical terms, such as 'first' and 'second', may modify the names of components irrespective of sequence or importance. These terms may be used to distinguish one component from another component, not limiting the components. When a component (e.g., a first component) is '(operatively or communicatively) coupled with/to' or 'connected to' another component (e.g., a second component), the first component may be connected to the second component directly or through any other component (e.g., a third component).

The term 'configured to' as used herein may be interchangeably used with the term 'suitable for', 'having the capacity to', 'designed to', 'adapted to', 'made to', or 'capable of' in hardware or software. The term 'configured to' may indicate that a device is 'capable of' with another device or part. For example, 'a processor configured to execute A, B, and C' may indicate a dedicated processor (e.g., an embedded processor) for performing the corresponding operations or a generic-purpose processor (e.g., a central processing unit (CPU), or an application processor (AP)) for performing the operations.

An electronic device according to an embodiment of the present disclosure may be a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, medical equipment, a camera, or an wearable device. The wearable device may be an accessory type device (e.g., a watch, a ring, a bracelet, an ankle bracelet, a necklace, glasses, contact lenses, or a head-mounted device (HMD)), a fabric or clothes type device (e.g., electronic clothes), an attached type device (e.g., a skin pad or a tattoo), or an implantable circuit.

An electronic device may be a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™, Apple TV™, Google TV™, etc.), a game console (e.g., Xbox™, PlayStation™, etc.), an electronic dictionary, an electronic key, a camcorder, or an electronic picture frame.

An electronic device may be a medical device (e.g., a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, etc.), a navigation device, a global navigation satellite system (GNSS), an event data recorder (EDR), a flight data recorder (FDR), an automotive infotainment device, a naval electronic device (e.g., a naval navigation device, a gyrocompass, etc.), an avionic electronic device, a security device, an in-vehicle head unit, an industrial or consumer robot, a drone, an automatic teller machine (ATM), a point of sales (POS) device, or an Internet of things (IoT) device (e.g., a lighting bulb, various sensors, a sprinkler, a fire alarm, a thermostat, a street lamp, a toaster, sports goods, a hot water tank, a heater, or a boiler).

An electronic device may be at least one of furniture, part of a building/structure or a vehicle, an electronic board, an electronic signature receiving device, a projector, and various measuring devices (e.g., water, electricity, gas, or electro-magnetic wave measuring devices).

An electronic device may be a flexible device.

An electronic device may be a combination of two or more of the foregoing devices.

An electronic device, however, is not limited to the foregoing devices.

Herein, the term 'user' may refer to a person or a device (e.g., artificial intelligence electronic device) that uses an electronic device.

FIG. 1 illustrates an electronic device and a network according to an embodiment of the present disclosure.

Referring to FIG. 1, an electronic device 101 in a network environment 100 includes a bus 110, a processor 120, a memory 130, an input/output (I/O) interface 150, a display 160, and a communication interface 170. At least one of the components may be omitted in the electronic device 101 or a component may be added to the electronic device 101.

The bus 110 may include a circuit that interconnects, the processor 120, the memory 130, the I/O interface 150, the display 160, and the communication interface 170, and allows communication (e.g., control messages and/or data) between the foregoing components. The processor 120 may include one or more of a CPU, an AP, or a communication processor (CP). The processor 120 may execute computation or data processing related to control and/or communication of at least one other component of the electronic device 101. The processor 120 may be referred to as "a controller".

The memory 130 may include a volatile memory and/or a non-volatile memory. The memory 130 may store instructions or data related to at least one other component of the electronic device 101. The memory 130 may store software and/or programs 140. The programs 140 include a kernel 141, middleware 143, an application programming interface (API) 145, and applications 147. At least a part of the kernel 141, the middleware 143, and the API 145 may be referred to as an operating system (OS). The kernel 141 may control or manage system resources (e.g., the bus 110, the processor 120, or the memory 130) that are used in executing operations or functions implemented in other programs (e.g., the middleware 143, the API 145, or the applications 147). The kernel 141 may provide an interface for the middleware 143, the API 145, or the applications 147 to access individual components of the electronic device 101, and control or manage system resources.

The middleware 143 may serve as a medium through which the kernel 141 may communicate with the API 145 or the applications 147 to transmit and receive data. The middleware 143 may process one or more task requests received from the applications 147 according to their priority levels. For example, the middleware 143 may assign priority levels for using system resources (e.g., the bus 110, the processor 120, or the memory 130) of the electronic device 101 to at least one of the applications 147, and process the one or more task requests according to the priority levels.

The API 145 is an interface for the applications 147 to control functions that the kernel 141 or the middleware 143 provides. The API 145 may include at least one interface or function (e.g., a command) for file control, window control, video processing, or text control.

The I/O interface 150 may provide a command or data received from a user or an external device to the other component(s) of the electronic device 101, or output a command or data received from the other component(s) of the electronic device 101 to the user or the external device.

The display 160 may include a liquid crystal display (LCD), a light emitting diode (LED) display, an organic LED (OLED) display, a microelectromechanical systems (MEMS) display, and/or an electronic paper display. The display 160 may display various types of content (e.g., text, an image, a video, an icon, and/or a symbol) to the user. The display 160 may include a touch screen, and receive a touch input, a gesture input, a proximity input, and/or a hovering input through an electronic pen or a user's body part.

The communication interface 170 may establish communication between the electronic device 101 and a first external electronic device 102, a second external electronic device 104, and/or a server 106. The communication interface 170 may be connected to a network 162 by wireless communication or wired communication, and communicate with the second external electronic device 104 or the server 106 over the network 162.

The wireless communication may include cellular communication conforming to at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM).

The wireless communication 164 may also include at least one of wireless fidelity (WiFi), Bluetooth, Bluetooth low energy (BLE), Zigbee, near field communication (NFC), magnetic secure transmission (MST), radio frequency (RF), or body area network (BAN).

The wireless communication may also include GNSS. GNSS may be global positioning system (GPS), global navigation satellite system (Glonass), Beidou navigation satellite system (Beidou), or Galileo, the European global satellite-based navigation system. Herein, the terms 'GPS' and 'GNSS' may be used interchangeably with each other.

The wired communication may be conducted in conformance to at least one of universal serial bus (USB), high definition multimedia interface (HDMI), recommended standard 232 (RS-232), power line communication, or plain old telephone service (POTS).

The network 162 may be a telecommunication network, e.g., at least one of a computer network (e.g., local area network (LAN) or wide area network (WAN)), the Internet, or a telephone network.

A wireless power reception circuit 190 may receive power from a wireless power transmitter and process the received power. The wireless power reception circuit 190 may rectify power in an alternating current (AC) waveform to a direct current (DC) waveform, convert or regulate the DC waveform to a form suitable for a power management integrated circuit (PMIC) of the electronic device 101 or a charger, and provide the power in the converted or regulated form.

A sensor 195 may measure information about movement of the electronic device 101. More specifically, the sensor 195 may include a gyro sensor or an accelerometer sensor, and thus, acquire information related to movement of the electronic device which will be described later in more detail. The sensor 195 may sense quantified information about movement of the electronic device 101.

Each of the first and second external electronic devices 102 and 104 may be of the same type as or a different type from the electronic device 101.

All or a part of operations performed in the electronic device 101 may be performed in one or more of the external electronic devices 102 and 104, or the server 106. If the electronic device 101 is to perform a function or a service, automatically or upon request, the electronic device 101 may request at least a part of functions related to the function or the service from the electronic device 102 and/or 104, and/or the server 106), instead of performing the function or the service autonomously, or additionally. The electronic device 102 and/or 104, and/or the server 106 may execute the requested function or an additional function and provide a result of the function execution to the electronic device 101. The electronic device 101 may provide the requested function or service based on the received result or by additionally processing the received result. For this purpose, cloud computing, distributed computing, or client-server computing may be used.

The sensor 195 may detect movement of the electronic device 101. The wireless power reception circuit 190 may include at least one of a coil for receiving power wirelessly, a rectifier for rectifying the power received from the coil, and a converter for converting the voltage of the rectified power to a predetermined output voltage. A PMIC may charge a battery of the electronic device, or supply consumption power to at least one hardware component of the electronic device, using with the converted power. The processor 120 may control a parameter for at least one of the rectifier or the PMIC based on the movement of the electronic device.

If the movement of the electronic device is less than a predetermined threshold, the processor 120 may set a voltage setting value for an output of the rectifier to a first voltage value, or if the movement of the electronic device is equal to or larger than the predetermined threshold, the processor 120 may set the voltage setting value for the output of the rectifier to a second voltage value. Herein, a first difference between the first voltage value and an output voltage of the converter may be less than a second difference between the second voltage value and the output voltage of the converter.

While the processor 120 is receiving power with the voltage setting value for the output of the rectifier set to the second voltage value based on the determination that the movement of the electronic device 101 is equal to or larger than the predetermined threshold, the processor 120 may monitor movement of the electronic device 101. If the processor 120 detects that the movement of the electronic device 101 is decreased to below the predetermined threshold, the processor 120 may change the voltage setting value for the output of the rectifier from the second voltage value to the first voltage value.

Upon detection of the initiation of wireless power reception, the processor 120 may set the voltage setting value for the output of the rectifier to the second voltage value higher than the first voltage value. If the processor 120 detects that the movement of the electronic device 101 is decreased to below the predetermined threshold, the processor 120 may change the voltage setting value for the output of the rectifier from the second voltage value to the first voltage value.

Upon detection of the initiation of wireless power reception, the processor 120 may set the voltage setting value for the output of the rectifier to the second voltage value higher than the first voltage value during a first time period. If the first time period has elapsed, the processor 120 may detect movement of the electronic device 101 again.

If the processor 120 determines that a voltage at an input of the PMIC is lower than a predetermined voltage threshold, the processor 120 may decrease an input current setting value for the PMIC from a first current value to a second current value less than the first current value. If with the input current setting value for the PMIC set to the second current value, the processor 120 determines that the movement of the electronic device is less than the predetermined threshold, the processor 120 may change the input current setting value for the PMIC from the second current value to the first current value.

If the processor 120 sets the input current setting value for the PMIC to the first current value, determines that the voltage at the input of the PMIC is lower than the predetermined voltage threshold, and the movement of the electronic device 101 is equal to or larger than the predetermined threshold, the processor 120 may maintain the input current setting value for the PMIC to be the first current value.

If the processor 120 determines that the voltage at the input of the PMIC is lower than the predetermined voltage threshold, and the movement of the electronic device 101 is equal to or larger than the predetermined threshold, the processor 120 may keep receiving the power.

The communication interface 170 may communicate with a wireless power transmitter that wirelessly transmits the power. If the processor 120 determines that the voltage at the input of the PMIC is lower than the predetermined voltage threshold, and the movement of the electronic device 101 is equal to or larger than the predetermined threshold, the processor 120 may control the communication interface 170 to discontinue the communication with the wireless power transmitter.

Before the communication interface 170 discontinues the communication with the wireless power transmitter, the processor 120 may control the communication interface 170 to transmit a signal including information indicating communication discontinuation to the wireless power transmitter.

If the processor 120 determines that the movement of the electronic device 101 is decreased to below the predetermined threshold, the processor 120 may control the communication processor 170 to resume communication with the wireless power transmitter.

Figure 2:
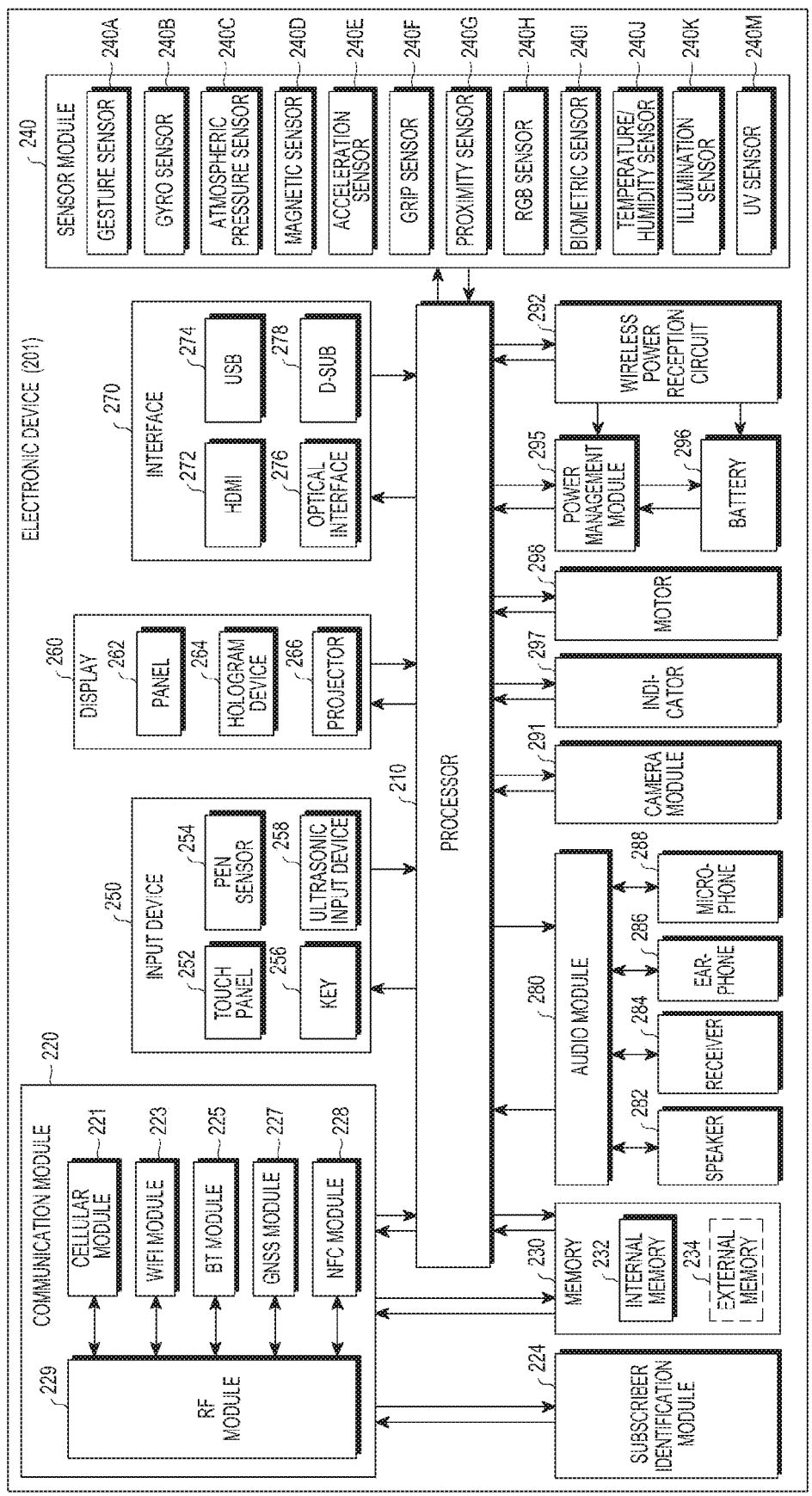
FIG. 2 illustrates an electronic device according to an embodiment of the present disclosure.

FIG. 2 illustrates an electronic device according to an embodiment of the present disclosure.

Referring to FIG. 2, the electronic device 201 includes a processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software components that are connected to the processor 210 by executing an OS or an application, and may perform processing or computation on various types of data. The processor 210 may be implemented as a system on chip (SoC). The processor 210 may further include a graphics processing unit (GPU) and/or an image signal processor (ISP). The processor 210 may include at least a part of the components illustrated in FIG. 2 (e.g., a cellular module 221). The processor 210 may load a command or data received from at least one of other components (e.g., a non-volatile memory), process the loaded command or data, and store result data in the non-volatile memory.

The communication module 220 includes the cellular module 221, a WiFi module 223, a Bluetooth (BT) module 225, a GNSS module 227, an NFC module 228, and an RF module 229. The cellular module 221 may provide services such as voice call, video call, text service, or Internet service, for example, through a communication network. The cellular module 221 may identify and authenticate the electronic device 201 within a communication network, using the SIM module 224 (e.g., a SIM Card). The cellular module 221 may perform at least a part of the functionalities of the processor 210. The cellular module 221 may include a CP.

At least a part (e.g., two or more) of the cellular module 221, the WiFi module 223, the BT module 225, the GNSS module 227, or the NFC module 228 may be included in a single integrated circuit (IC) or IC package.

The RF module 229 may transmit and receive communication signals (e.g., RF signals). The RF module 229 may include a transceiver, a power amplifier module (PAM), a frequency filter, a low noise amplifier (LNA), an antenna, etc.

At least one of the cellular module 221, the WiFi module 223, the BT module 225, the GNSS module 227, or the NFC module 228 may transmit and receive RF signals via a separate RF module.

The SIM 224 may include a card including the SIM and/or an embedded SIM. The SIM 224 may include a unique identifier (e.g., integrated circuit card identifier (ICCID)) or subscriber information (e.g., international mobile subscriber identity (IMSI)).

The memory 230 includes an internal memory 232 and an external memory 234. The internal memory 232 may include a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, a hard drive, or a solid state drive (SSD)). The external memory 234 may include a flash drive, such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively or physically coupled to the electronic device 201 via various interfaces.

The sensor module 240 may measure physical quantities or detect operational states of the electronic device 201, and convert the measured or detected information into electric signals. The sensor module 240 includes a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illumination sensor 240K, and an ultra violet (UV) sensor 240M. Additionally or alternatively, the sensor module 240 may include an electrical-nose (E-nose) sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein.

The electronic device 201 may further include a processor configured to control the sensor module 240, as a part of or separately from the processor 210. Thus, while the processor 210 is in a sleep state, the control circuit may control the sensor module 240.

The input device 250 includes a touch panel 252, a (digital) pen sensor 254, a key 256, and an ultrasonic input device 258. The touch panel 252 may operate in at least one of capacitive, resistive, infrared, and ultrasonic schemes. The touch panel 252 may include a control circuit. The touch panel 252 may further include a tactile layer to thereby provide haptic feedback to the user.

The (digital) pen sensor 254 may include, a detection sheet which is a part of the touch panel or separately configured from the touch panel.

The key 256 may include a physical button, an optical key, or a keypad.

The ultrasonic input device 258 may sense ultrasonic signals generated by an input tool using a microphone 288, and identify data corresponding to the sensed ultrasonic signals.

The display 260 includes a panel 262, a hologram device 264, a projector 266, and/or a control circuit. The panel 262 may be configured to be flexible, transparent, and/or wearable.

The panel 262 and the touch panel 252 may be implemented as one or more modules.

The panel 262 may include a pressure sensor or a force sensor for measuring the strength of the pressure of a user touch. The pressure sensor may be integrated with the touch panel 252, or configured as one or more sensors separately from the touch panel 252.

The hologram device 264 may utilize the interference of light waves to provide a three-dimensional image in empty space.

The projector 266 may display an image by projecting light on a screen. The screen may be positioned inside or outside the electronic device 201.

The interface 270 includes an HDMI 272, a USB 274, an optical interface 276, and a D-subminiature (D-sub) 278. Additionally or alternatively, the interface 270 may include a mobile high-definition link (MHL) interface, an SD/multimedia card (MMC) interface, or an Infrared Data Association (IrDA) interface.

The audio module 280 may convert a sound to an electrical signal, and vice versa. The audio module 280 may process sound information input into, or output from a speaker 282, a receiver 284, an earphone 286, and/or the microphone 288.

The camera module 291 may capture still images and a video. The camera module 291 may include one or more image sensors (e.g., a front sensor or a rear sensor), a lens, an ISP, or a flash (e.g., an LED or a xenon lamp).

The power management module 295 may manage power of the electronic device 201. The power management module 295 may include a power management integrated circuit (PMIC), a charger IC, or a battery gauge. The PMIC may adopt wired and/or wireless charging. The wireless charging may be performed in a magnetic resonance scheme, a magnetic induction scheme, or an electromagnetic wave scheme, and may further include an additional circuit for wireless charging, for example, a coil loop, a resonance circuit, or a rectifier.

The battery gauge may measure, a charge level, a voltage while charging, current, or temperature of the battery 296. The battery 296 may include a rechargeable battery and/or a solar battery. A wireless power reception circuit 292 may process received external power and supply the processed power to the power management module 295 or the battery 296.

The indicator 297 may indicate specific states of the electronic device 201 or a part of the electronic device 201 (e.g., the processor 210), such as boot status, message status, or charge status.

The electronic device 201 may include a mobile TV support device (e.g., a GPU) for processing media data compliant with digital multimedia broadcasting (DMB), digital video broadcasting (DVB), and/or MediaFLO™.

Each of the above-described components of the electronic device may include one or more parts, and the name of the component may vary depending on the type of the electronic device. Some component may be omitted from or added to the electronic device (e.g., the electronic device 201). Alternatively, a single component may be configured by combining a part of the components of the electronic device, to thereby perform the same functions of the components prior to the combining.

Figure 3:
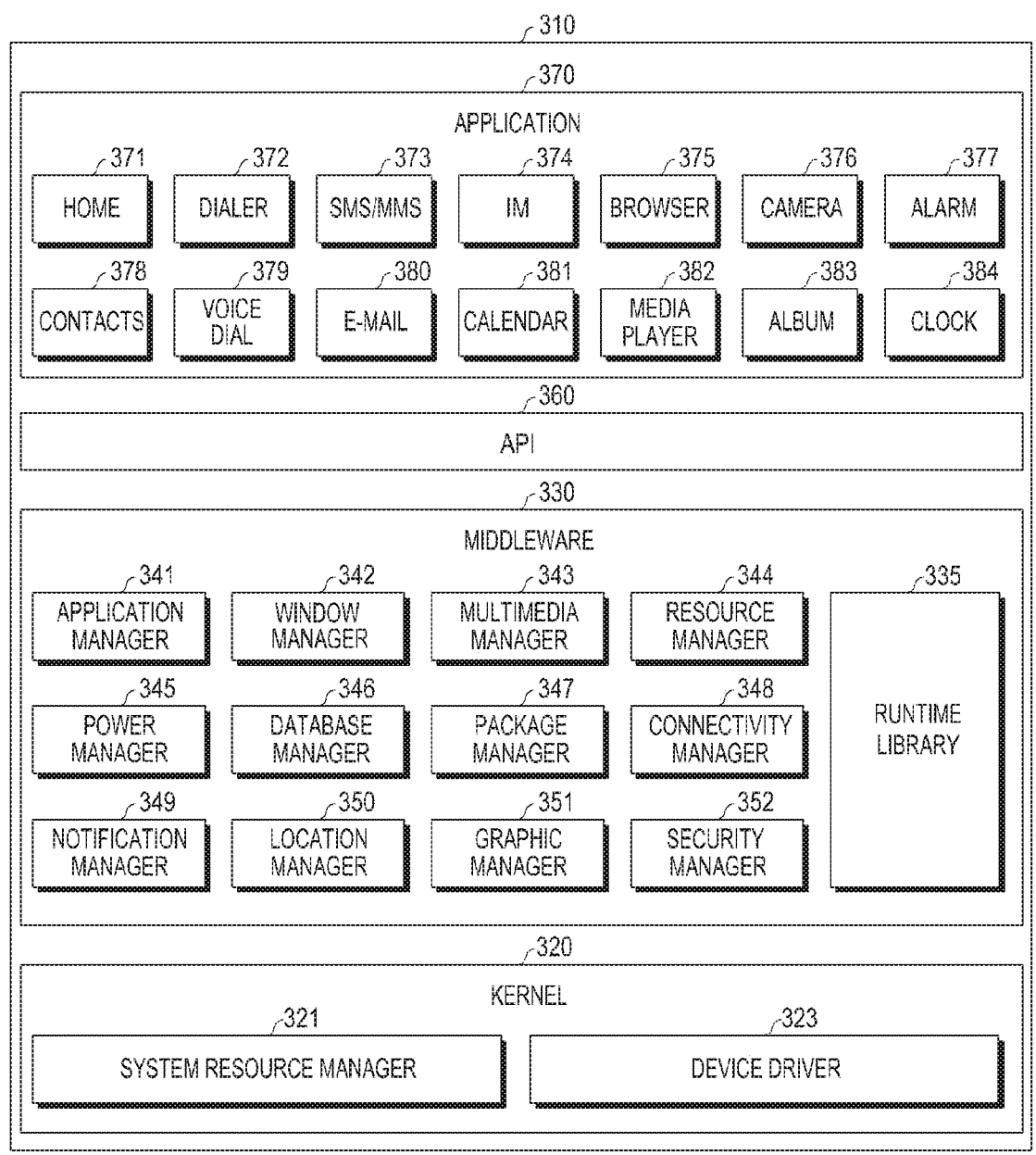
FIG. 3 illustrates a programming module according to an embodiment of the present disclosure.

FIG. 3 illustrates a programming module according to an embodiment of the present disclosure.

Referring to FIG. 3, a programming module 310 may include an OS that controls resources related to an electronic device (e.g., the electronic device 101) and/or various applications executed on the OS (e.g., applications 147). The OS may be Android™, iOS™, Windows™, Symbian™, Tizen™, or Bada™.

The programming module 310 includes a kernel 320, middleware 330, an API 360, and applications 370. At least a part of the programming module 310 may be preloaded on the electronic device or downloaded from an external electronic device.

The kernel 320 includes a system resource manager 321 and a device driver 323. The system resource manager 321 may control, allocate, or deallocate system resources. The system resource manager 321 may include a process manager, a memory manager, or a file system manager. The device driver 323 may include a display driver, a camera driver, a Bluetooth driver, a shared memory driver, a USB driver, a keypad driver, a WiFi driver, an audio driver, or an inter-process communication (IPC) driver. The middleware 330 may provide a function required for the applications 370 or provide various functionalities to the applications 370 through the API 360 such that the applications 370 may use limited system resources available within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a complier uses to add a new function in a programming language during execution of an application 370. The runtime library 335 may perform input/output management, memory management, or arithmetic function processing.

The application manager 341 may manage the life cycle of the applications 370.

The window manager 342 may manage GUI resources used for a screen.

The multimedia manager 343 may determine formats required to play back media files and may encode or decode a media file using a CODEC suitable for the format of the media file.

The resource manager 344 may manage source code or memory space.

The power manager 345 may manage a battery or a power source and provide power information required for operation of the electronic device. The power manager 345 may interact with a basic input/output system (BIOS).

The database manager 346 may generate, search, or modify a database to be used for the applications 370.

The package manager 347 may manage installation or update of an application distributed as a package file.

The connectivity manager 348 may manage wireless connectivity.

The notification manager 349 may provide a user with an event such as message arrival, a schedule, a proximity notification, etc.

The location manager 350 may mange position information about the electronic device.

The graphic manager 351 may manage graphical effects to be provided to the user or related user interfaces.

The security manager 352 may provide system security or user authentication.

The middleware 330 may include a telephony manager to manage a voice or video call function of the electronic device, or a middleware module for combining functions of the above-described components. The middleware 330 may provide a customized module for each OS type. The middleware 330 may dynamically delete a part of the existing components or add a new component.

The API 360 is a set of API programming functions, which may be configured according to an OS. For example, in the case of Android or iOS, one API set may be provided per platform, whereas in the case of Tizen, two or more API sets may be provided per platform.

The applications 370 include a home application 371, a dialer application 372, a short message service/multimedia messaging service (SMS/MMS) application 373, an instant message (IM) application 374, a browser application 375, a camera application 376, an alarm application 377, a contacts application 378, a voice dial application 379, an email application 380, a calendar application 381, a media player application 382, an album application 383, a watch application 384, a healthcare application (e.g., measurement of an exercise amount or a glucose level), or an application for providing environment information (e.g., information about atmospheric pressure, humidity, or temperature).

The applications 370 may include an information exchange application capable of supporting information exchange between the electronic device and an external electronic device. The information exchange application may include a notification relay application for transmitting specific information to the external electronic device or a device management application for managing the external electronic device. The notification relay application may transmit notification information generated from another application to the external electronic device, or receive notification information from the external electronic device and transmit the received notification information to a user.

The device management application may install, delete, or update functions of the external electronic device communicating with the electronic device (e.g., turning-on/turning-off of the external electronic device (or a part of its components), control of the brightness or resolution of the display), or an application executed in the external electronic device.

The applications 370 may include an application (e.g., a healthcare application of a mobile medical equipment) designated according to a property of the external electronic device. The applications 370 may include an application received from an external electronic device. At least a part of the programming module 310 may be realized (e.g., implemented) in software, firmware, hardware (e.g., the processor 210), or a combination of at least two of them, and may include a module, a program, a routine, a set of instructions, or a process to execute one or more functions.

The term "module" as used herein may refer to a unit including one or a combination of two or more of hardware, software, and firmware. The term "module" may be used interchangeably with terms such as "unit", "logic", "logical" "block", "part", or "circuit". A "module" may be the smallest unit of an integrated part or a portion thereof. A "module" may be the smallest unit for performing one or more functions, or a portion thereof. A "module" may be implemented mechanically, or electronically. A "module" may include at least one of a known, or to-be-developed, application specific integrated circuit (ASIC) chip, field programmable gate array (FPGA), or programmable logic device that perform certain operations. At least a part of devices (e.g., modules or their functions) or methods (e.g., operations) according to various embodiments of the present disclosure may be implemented as commands stored in a computer-readable storage medium (e.g., the memory 130), in the form of a programming module.

When the commands are executed by a processor (e.g., the processor 120), the processor may execute functions corresponding to the commands. The computer-readable medium may include hard disk, floppy disk, magnetic media (e.g., magnetic tape), optical media (e.g., compact disc read-only memory (CD-ROM)), DVD, magneto-optical media (e.g., floptical disk), hardware devices (e.g., read-only memory, random access memory, or flash memory)), etc. Program instructions may include machine language code that are produced by a compiler or high-level language code that may be executed by a computer using an interpreter. A module or a programming module may include one or more of the above-described components, may omit a portion thereof, or may include additional components. Operations that are performed by a module, a programming module, or other components according to the present disclosure may be processed in a serial, parallel, repetitive or heuristic manner. Also, some operations may be performed in a different order or omitted, or additional operations may be added.

Figure 4A:
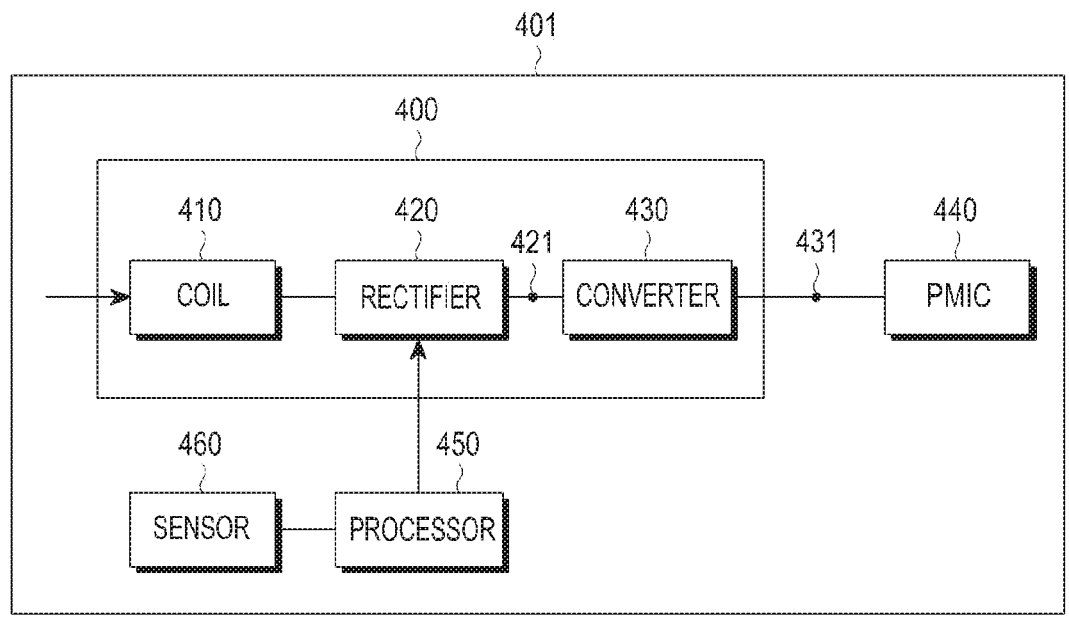
FIG. 4A illustrates an electronic device according to an embodiment of the present disclosure.

FIG. 4A illustrates an electronic device according to an embodiment of the present disclosure.

Referring to FIG. 4, the electronic device 401 includes a processor 450, a sensor 460, a wireless power reception circuit 400, and a PMIC 440. The wireless power reception circuit 400 includes a coil 410, a rectifier 420, and a converter 430. Alternatively, the wireless power reception circuit 400 may include at least one of the coil 410, the rectifier 420, or the converter 430. For example, the wireless power reception circuit 400 may be configured in various manners to include at least one of the coil 410, the rectifier 420, or the converter 430 such as the configuration of the coil 410 is a hardware component separate from the rectifier 420 and the converter 430, or the configuration of the coil 410, the rectifier 420, and the converter 430 is separate hardware components. Further, while FIG. 4 illustrates the processor 450 configured as a hardware component separate from the wireless power reception circuit 400, alternatively, the wireless power reception circuit 400 may include a computation unit such as a micro controlling unit (MCU) different from the processor 450. In this case, the MCU and at least one of the coil 410, the rectifier 420, or the converter 430 may be incorporated into a single module.

The coil 410 may receive power wirelessly from a wireless power transmitter. For example, the coil 410 may generate induced electromotive force, using a magnetic field generated around the coil 410, and output the induced electromotive force, that is, the wirelessly received power, to the rectifier 420. The coil 410 may be fabricated in a manner that satisfies parameters conforming to various wireless power standards. At least one capacitor may be connected to the coil 410. For example, the electronic device 401 may be configured to receive power wirelessly in conformance to the wireless power consortium (WPC) standard. In this case, the coil 410 may be configured to form a resonant circuit having a resonant frequency of 100 to 200 kHz, together with the at least one connected capacitor.

The electronic device 401 may be configured to receive power wirelessly in conformance to the air fuel alliance (AFA) standard. In this case, the coil 410 may be configured to form a resonant circuit having a resonant frequency of 6.78 MHz, together with the at least one connected capacitor. The coil 410 may be configured in conformance to various wireless power standards, and those skilled in the art will readily understand that the type of the standard does not limited the present disclosure.

The rectifier 420 may rectify the power received from the coil 410 to a DC waveform. The power received from the coil may have an AC waveform, and may be rectified to a DC waveform by the rectifier 420. The rectifier 420 may be configured as any of various types including bridge diode, half-wave rectifier, and full-wave rectifier, and the types are not limited. The magnitude of a voltage at an output 421 of the rectifier 420 may be adjusted by the processor 450. The processor 450 may perform a control operation on the rectifier 420. For example, the processor 450 may adjust a voltage setting value for the output 421 of the rectifier 420. The processor 450 may adjust the voltage setting value for the output 421 of the rectifier 420 based on information about movement of the electronic device 401. The processor 450 may receive, from the sensor 460, quantified information about movement of the electronic device 401. The processor 450 may determine whether the movement exceeds a predetermined threshold. If the processor 450 determines that the movement of the electronic device 401 is less than the predetermined threshold, the processor 450 may set the voltage setting value for the output 421 of the rectifier 420 to a first voltage value which is relatively low. However, if the processor 450 determines that the movement of the electronic device 401 is equal to or greater than the predetermined threshold, the processor 450 may set the voltage setting value for the output 421 of the rectifier 420 to a second voltage value. The second voltage value may be larger than the first voltage value. If the voltage value of the output 421 of the rectifier 420 is the second voltage value, the voltage at an output 431 of the converter 430 may be affected less by a coupling change, which will be described in greater detail with reference to FIGS. 5A, 5B and 5C. The processor 450 may control the voltage setting value for the output 421 of the rectifier 420 according to various conditions, and a relationship between the various conditions and voltage setting values will be described later in greater detail.

The converter 430 may convert the rectified power received from the rectifier 420. For example, the converter 430 may decrease or increase the voltage of the received rectified power. Further, the converter 430 may regulate the converted power.

The PMIC 440 may charge the battery of the electronic device 401 or supply driving power to various hardware components of the electronic device 401 that use the converted power. The PMIC 440 may be configured as a charger. If the PMIC 440 is configured as a charger, the PMIC 440 may process the received power and charge the battery with the processed power according to a voltage and current of the battery. For example, if the voltage of the battery is lower than a threshold, the PMIC 440 may operate in constant current (CC) mode and thus maintain a constant current value for power supplied to the battery. However, if the voltage of the battery has reached the threshold, the PMIC 440 may operate in constant voltage (CV) mode and thus maintain a constant voltage value for power supplied to the battery. If a voltage value of an output 431 of the converter 430, that is, a voltage value at an input of the PMIC 440 is less than a threshold, the PMIC 440 may discontinue wireless charging or perform an AICL operation. If the voltage of the output 421 of the rectifier 420 has a relatively high value, the voltage value of the output 431 of the converter 430 may be maintained at or above a predetermined threshold, thereby preventing discontinuation of wireless charging or implementation of the AICL operation.

Figure 5A:
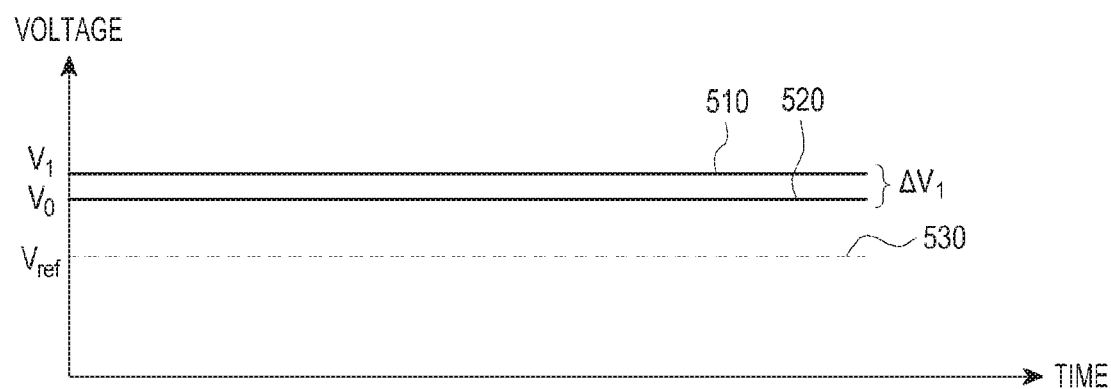
FIGS. 5A, 5B and 5C are graphs illustrating voltage values at various points of an electronic device according to an embodiment of the present disclosure.
Figure 5B:
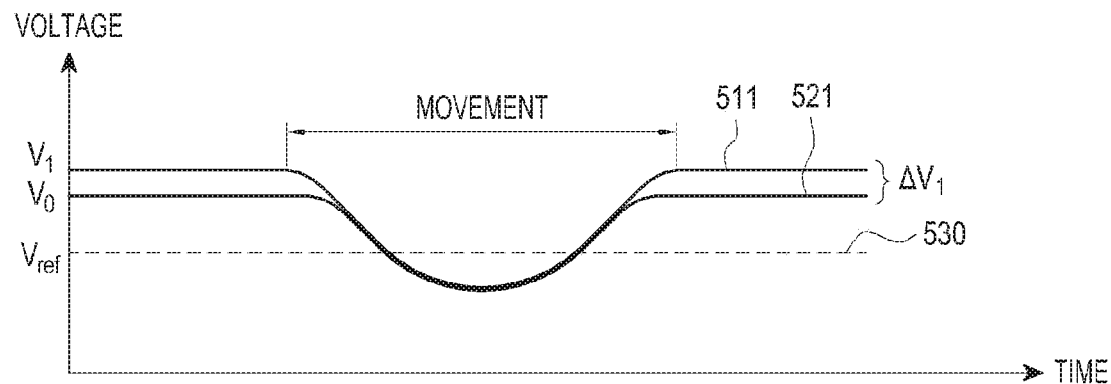
Figure 5C:
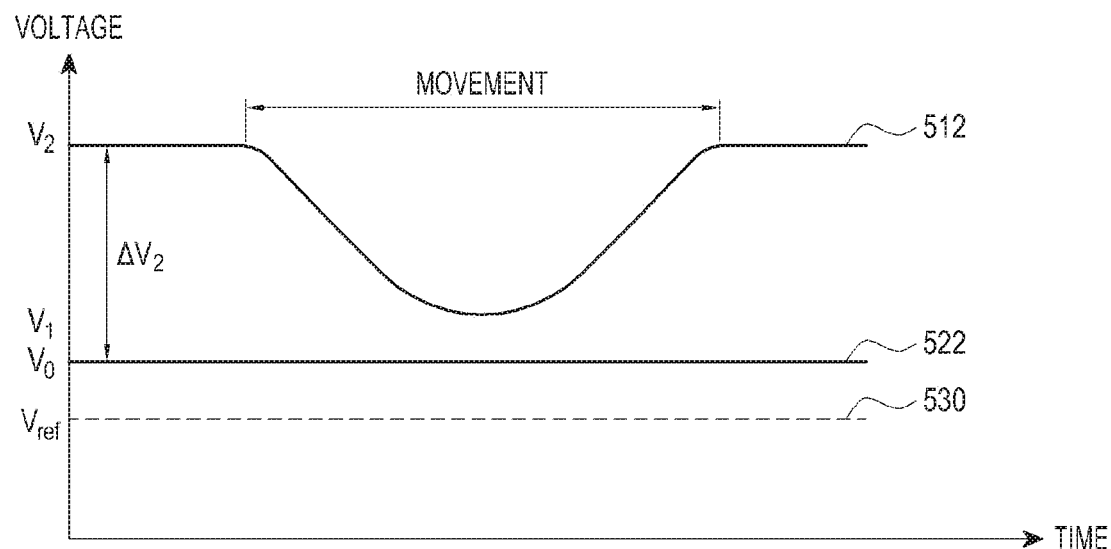

FIGS. 5A, 5B and 5C are graphs illustrating voltage values at various points of an electronic device according to various an embodiments of the present disclosure.

Referring to FIG. 5A, a voltage value 510 at the output 421 of the rectifier 420 may be a first voltage value $V_1$. The processor 450 may set the voltage setting value for the output 421 of the rectifier 420 to the first voltage value $V_1$, thereby setting the voltage value 510 at the output 421 of the rectifier 420 to the first voltage value $V_1$. Further, a voltage value 520 at the output 431 of the converter 430 may be set to a third voltage value $V_0$. The difference $\Delta V_1$ between the first voltage value $V_1$ and the third voltage value $V_0$ may be set to a small value, e.g., about 80 mV, in order to set the efficiency of the converter 430 to be relatively high by setting the difference between the input and output voltage values of the converter 430 to be relatively small. The difference between the input and output voltages of the converter 430 may be referred to as a headroom. A threshold 530 set for the output 431 of the converter 430 may have a voltage value $V_{ref}$. The output 431 of the converter 430 may be referred to as the input of the PMIC 440. If a voltage measured at the output 401 of the converter 430 is lower than the threshold 530, the electronic device 401, for example, the processor 450 or the PMIC 440, may discontinue wireless charging or perform the AICL operation. The AICL operation may increase the voltage value of the input of the PMIC 440 by decreasing the value of an input current of the PMIC 440, which will be described in greater detail below.

Figure 4B:
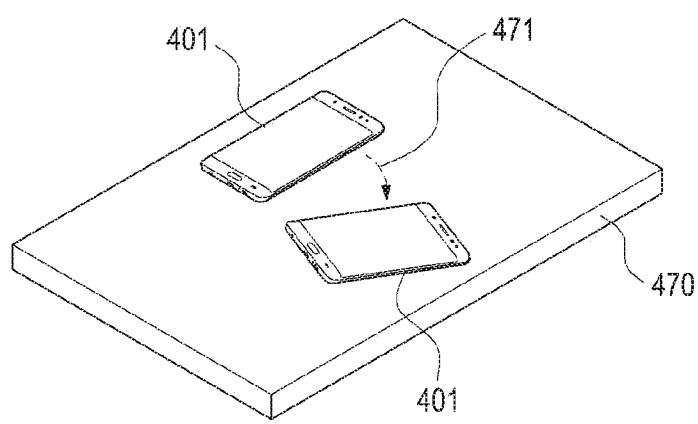
FIG. 4B illustrates movement of an electronic device on a wireless power transmitter according to an embodiment of the present disclosure.

As illustrated in FIG. 5B, the voltage value at the output 431 of the converter 430 may be decreased below the threshold 530. As illustrated in FIG. 4B, the electronic device 401 may be placed on a wireless power transmitter 470. The electronic device 401 placed on the wireless power transmitter 470 may be moved by a user, as indicated by reference numeral 471. When the user moves the electronic device 401, a relationship between relative positions of the coil 410 of the electronic device 401 and a coil of the wireless power transmitter 470 may be changed, thus affecting the level of power received at the electronic device 401. That is, a change may occur to the received power or the rectified power. Accordingly, a voltage value 511 at the output 421 of the rectifier 420 in the electronic device 401 may be decreased below the threshold 530 during a movement occurrence period. That is, even though the voltage setting value for the output 421 of the rectifier 420 is set to the first voltage value $V_1$, the movement 471 of the electronic device 401 may lead to a decrease in the voltage value 511 at the output 421 of the rectifier 420 below the threshold 530. As the voltage value 511 at the output 421 of the rectifier 420 is decreased below the threshold 530, a voltage value 521 at the output 431 of the converter 430 is also decreased below the threshold 530. As a consequence, the processor 450 or the PMIC 440 may discontinue wireless charging or performs the AICL operation.

Upon detecting the movement 471 of the electronic device 401, the electronic device 401 may set the voltage setting value for the output 421 of the rectifier 420 to a second voltage value $V_2$ which is relatively high.

Therefore, as illustrated in FIG. 5C, a voltage value 512 of the output 421 of the rectifier 420 may be maintained to be the second voltage value $V_2$ in an initial stage, and may be equal to or larger than the third voltage value $V_0$ even during the movement. The difference $\Delta V_2$ between the second voltage value $V_2$ and the third voltage value $V_0$ may be relatively large, thus decreasing the efficiency of the converter 430. The difference $\Delta V_2$ between the second voltage value $V_2$ and the third voltage value $V_0$ may be equal to or larger than, for example, 200 mV. However, a voltage value 522 at the output 431 of the converter 430 may be maintained to be the third voltage value $V_0$. The resulting prevention of discontinuation of wireless charging or implementation of the AICL operation may enable reliable wireless charging. That is, the electronic device 401 may set the headroom between the input and output voltages of the converter 430 to be relatively large in correspondence with the movement of the electronic device 401. The electronic device 401 or the processor 450 may adjust the headroom between the input and output voltages of the converter 430 by directly controlling the converter 430 based on the movement of the electronic device 401.

Figure 6A:
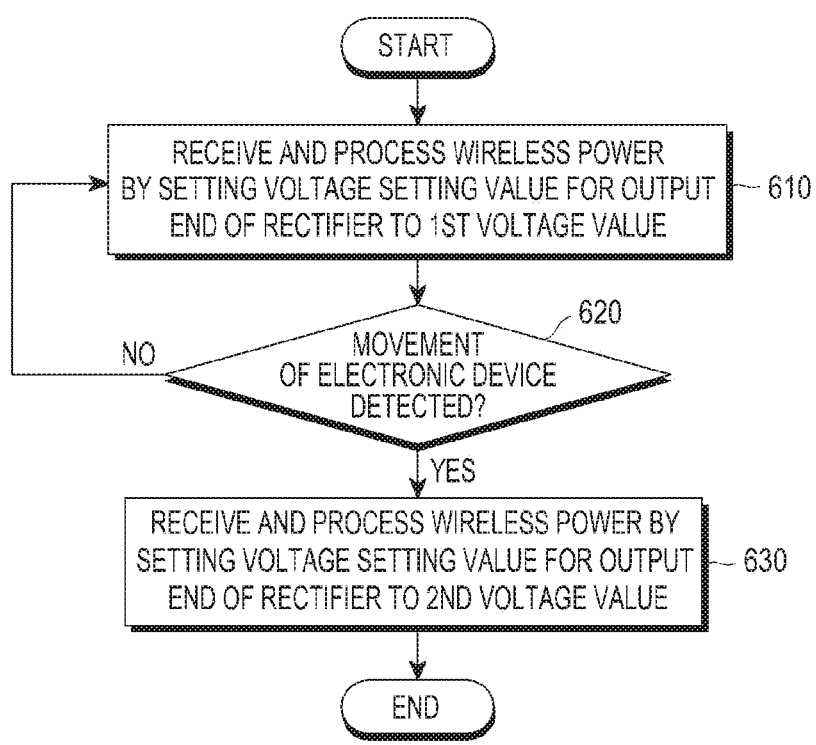
FIG. 6A is a flowchart illustrating a method for controlling an electronic device according to an embodiment of the present disclosure.

FIG. 6A is a flowchart illustrating a method for controlling an electronic device according to an embodiment of the present disclosure.

Referring to FIG. 6A, performing a specific operation by the electronic device 401 may mean performing the specific operation by the processor 450 of the electronic device 401, may mean controlling any other hardware component to perform the specific operation by the processor 450 of the electronic device 401, or may mean performing the specific operation by any other hardware component without control of the processor 450.

In step 610, the electronic device 401 may set a voltage setting value for the output of the rectifier to a first voltage value, receive power wirelessly, and process the received power. For example, the first voltage value may be set such that the difference between the first voltage value and a voltage setting value for the output of the converter is relatively small. The electronic device 401 may receive power wirelessly, and rectify and convert the received power.

In step 620, the electronic device 401 may determine whether its movement has been detected. The electronic device 401 may acquire information about the movement of the electronic device 401 through a sensor. The sensor may measure quantified information about the movement. If the electronic device 401 determines that the movement is equal to or larger than a threshold, the electronic device 401 may determine that its movement has been detected.

In step 630, upon detection of the movement of the electronic device 401, the electronic device 401 may receive power wirelessly and process the received power by setting the voltage setting value for the output of the rectifier to a second voltage value. As described before, the second voltage value may be larger than the first voltage value. Therefore, even though the electronic device 401 moves, the voltage value of the output of the rectifier and the voltage value of the output of the converter may be maintained to be equal to or larger than the threshold, thereby preventing discontinuation of wireless charging or implementation of an AICL operation. As described before, as the electronic device 401 adjusts a parameter for the rectifier (e.g., a setting value for an output voltage of the rectifier) in correspondence with movement information, wireless charging may be performed reliable.

Figure 6B:
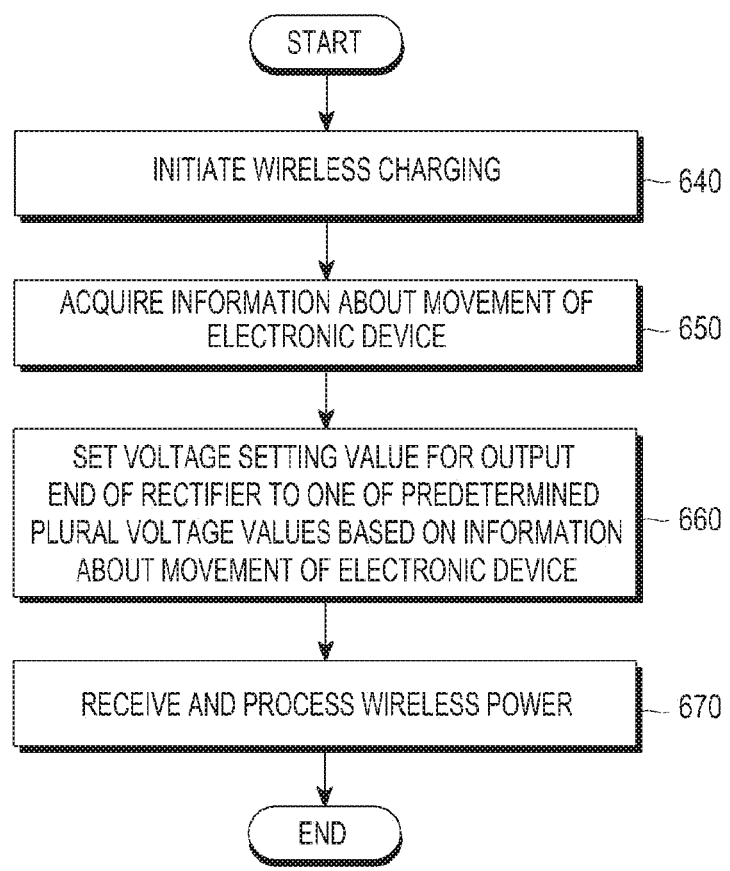
FIG. 6B is a flowchart illustrating a method for controlling an electronic device according to an embodiment of the present disclosure.

FIG. 6B is a flowchart illustrating a method for controlling the electronic device according to an embodiment of the present disclosure.

Referring to FIG. 6B, in step 640, the electronic device 401 initiates wireless charging. The electronic device 401 may perform a wireless charging initiation operation in conformance to any of various wireless charging standards. For example, if the electronic device 401 performs wireless charging in conformance to the WPC standard, the electronic device 401 may initiate the wireless charging by receiving a signal from a wireless power transmitter, transmitting a response signal, and transmitting information about an identifier (ID) and a required power level.

In step 650, the electronic device 401 acquires its movement information. The electronic device 401 may set a voltage setting value for the output of the rectifier to one of a plurality of predetermined voltage values based on the movement information about the electronic device 401 in step 660. For example, if the electronic device 401 determines that the movement is equal to or larger than a predetermined threshold, the electronic device 401 may set the voltage value of the output of the rectifier to a second voltage value which is relatively large. In this case, the difference between the input and output voltage values of the converter may be maintained to be large. Therefore, even though coupling between coils becomes weak due to the movement of the electronic device 401, the voltage at the output of the converter may be maintained to be equal to or larger than the predetermined threshold. That is, even though the level of received power is dropped due to the movement of the electronic device, e.g., a change in a mutual inductance, the voltage of the output of the converter may be maintained to be equal to or larger than the predetermined threshold.

Further, if the electronic device 401 determines that the movement is less than the threshold, the electronic device 401 may set the voltage of the output of the rectifier to a first voltage value which is relatively small. If the electronic device 401 does not move, a change occurrence possibility is decreased, thereby maintaining a relatively small headroom and thus increasing the efficiency of the converter.

In step 670, the electronic device 401 receives power wirelessly and process the received power.

As described before, the electronic device 401 may perform wireless charging reliably by adjusting a parameter for at least one hardware component of the wireless power reception circuit, for example, the voltage setting value for the output of the rectifier or the voltage setting value for the input of the converter, based on the movement of the electronic device 401.

Figure 7:
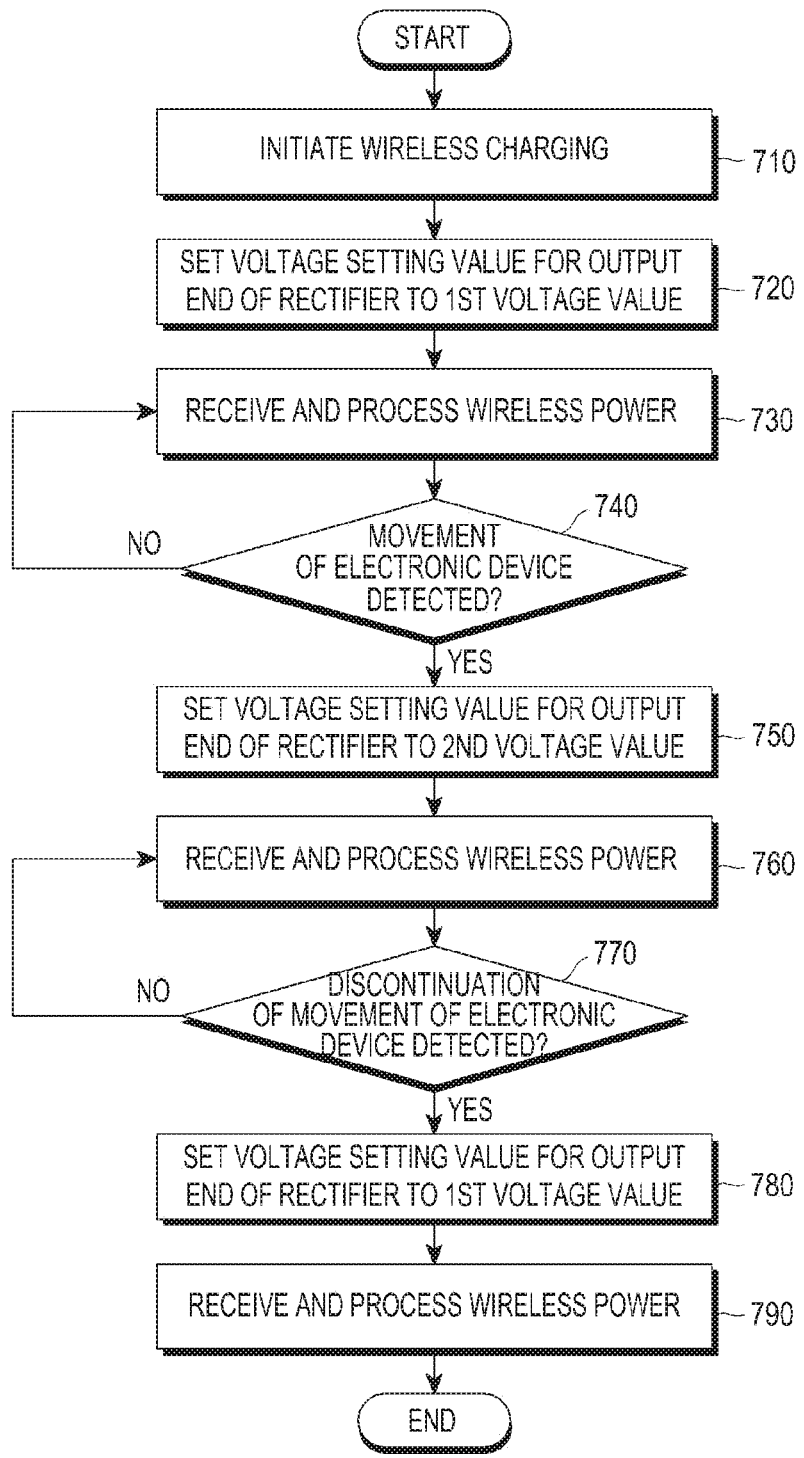
FIG. 7 is a flowchart illustrating a method for controlling an electronic device according to an embodiment of the present disclosure.

FIG. 7 is a flowchart illustrating a method for controlling an electronic device according to an embodiment of the present disclosure.

Referring to FIG. 7, in step 710, the electronic device 401 initiates wireless charging. The electronic device 401 sets a voltage setting value for the output of the rectifier to a first voltage value in step 720, and receives power wirelessly and process the received power in step 730.

In step 740, the electronic device 401 determines whether its movement has been detected. For example, if quantified movement information is equal to or larger than a predetermined threshold, the electronic device 401 may determine that its movement has been detected.

Upon detection of the movement of the electronic device 401, the electronic device 401 sets the voltage setting value for the output of the rectifier to a second voltage value in step 750.

In step 760, the electronic device 401 receives power wirelessly and process the received power.

As described before, the second voltage value may be larger than the first voltage value. Therefore, even though a magnitude change occurs due to the movement of the electronic device, the voltage of the output of the converter may be maintained to be equal to or larger than the threshold.

In step 770, the electronic device 401 detects discontinuation of the movement of the electronic device 401. If the electronic device 401 detects that the quantified movement information is less than the predetermined threshold for a predetermined time period or longer, the electronic device 401 may determine that the movement of the electronic device 401 has been discontinued.

If the electronic device 401 determines that the movement of the electronic device 401 has been discontinued, the electronic device 401 sets the voltage setting value for the output of the rectifier to the first voltage value in step 780. That is, the electronic device 401 may change the voltage setting value for the output of the rectifier from the second voltage value to the first voltage value. Therefore, the voltage of the output of the rectifier may have the first voltage value which is relatively small, and the headroom of the converter may be reduced, thereby increasing overall wireless power throughput. In step 790, the electronic device 401 may receive power wirelessly and process the received power.

As described before, if the electronic device 401 determines that its movement has been discontinued, the electronic device 401 may readjust the headroom of the converter.

Figure 8:
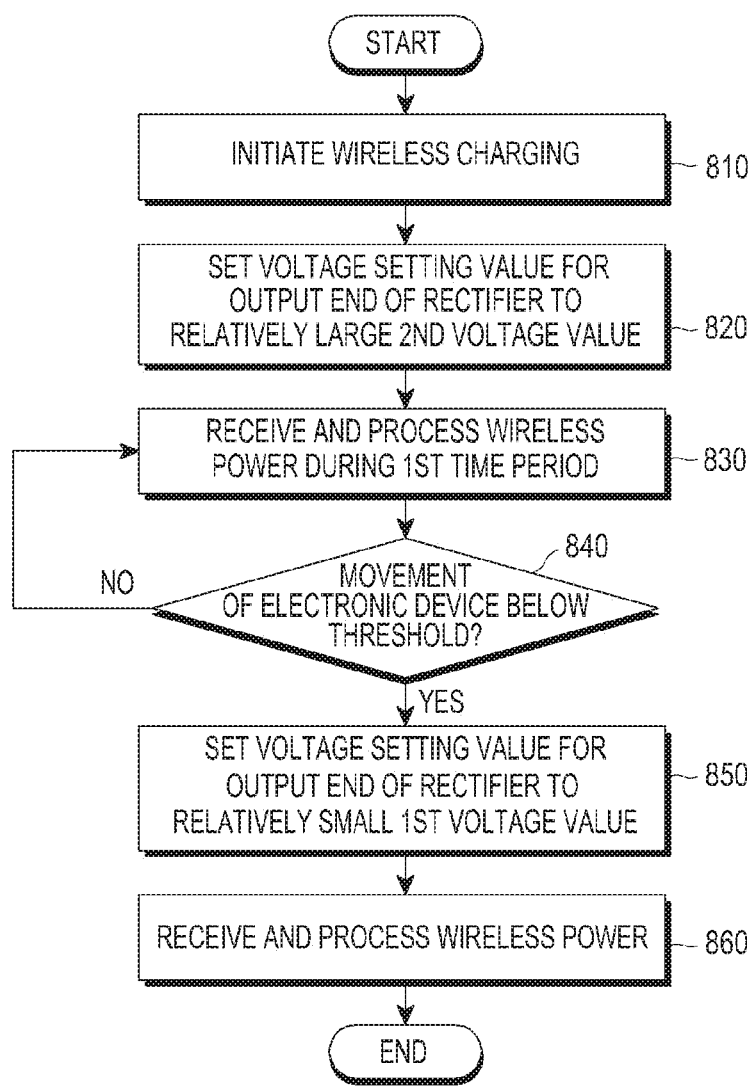
FIG. 8 is a flowchart illustrating a method for controlling an electronic device according to an embodiment of the present disclosure.

FIG. 8 is a flowchart illustrating a method for controlling an electronic device according to an embodiment of the present disclosure. FIG. 8 will be described in detail with reference to FIGS. 9A and 9B, which are graphs illustrating voltage information at various points of an electronic device according to an embodiment of the present disclosure.

Referring to FIG. 8, in step 810, the electronic device 401 initiates wireless charging.

Upon detection of the initiation of wireless charging, the electronic device 401 sets a voltage setting value for the output of the rectifier to a second voltage value which is relatively large in step 820. If a user places the electronic device 401 on a wireless power transmitter, the user may move the electronic device 401. Accordingly, the electronic device 401 may set the voltage setting value for the output of the rectifier to the second voltage value which is relatively large during a predetermined time period from the time of initiating the wireless charging.

Figure 9A:
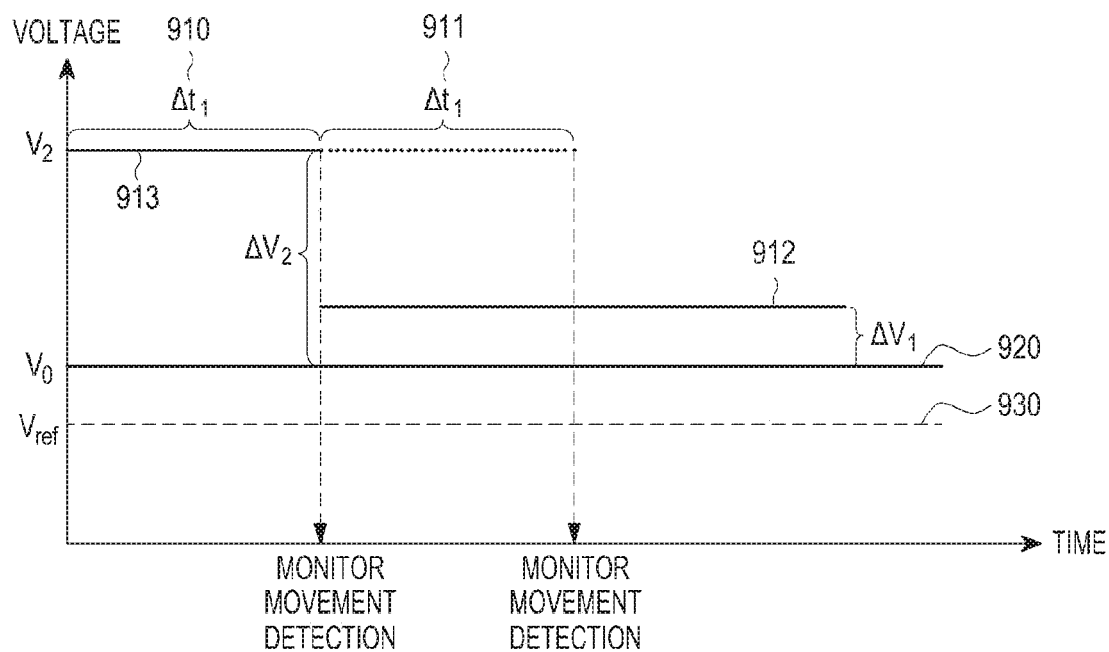
FIGS. 9A and 9B are graphs illustrating voltage information at various points of an electronic device according to an embodiment of the present disclosure.

For example, as illustrated in FIG. 9A, as the electronic device 401 sets the voltage setting value for the output of the rectifier to the second voltage value, a voltage 913 at the output of the rectifier may be the second voltage value $V_2$. Thus, even though a magnitude change occurs due to the movement of the electronic device, a voltage 920 at the output of the converter may be maintained to be equal to or higher than the threshold $V_{ref}$.

Figure 9B:
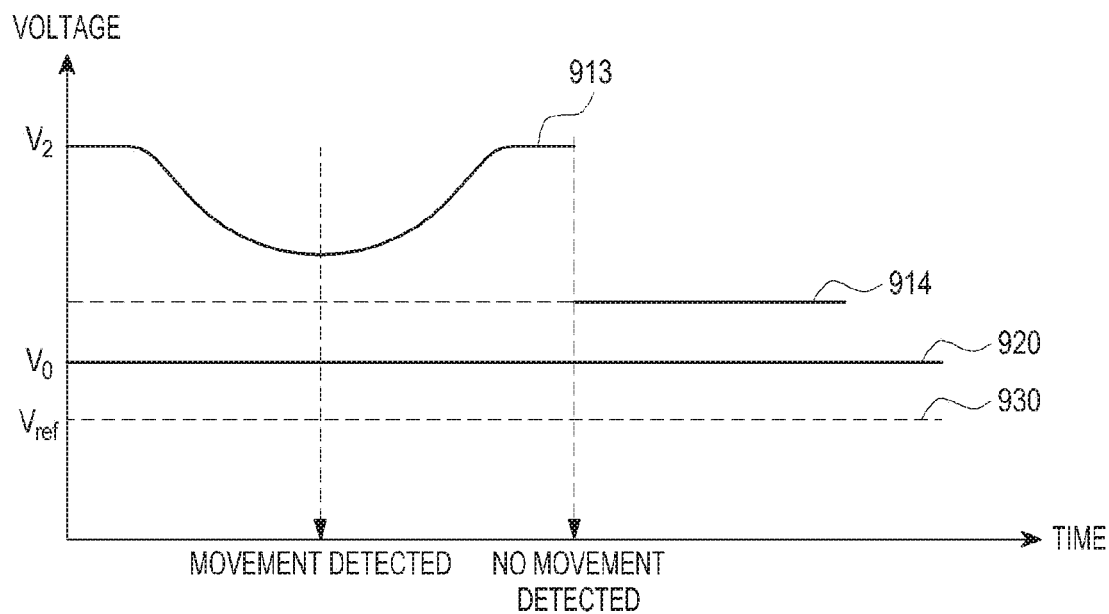

For example, as illustrated in FIG. 9B, a voltage 913 at the output of the rectifier may be dropped along with movement of the electronic device 401. Even in this case, the voltage 913 at the output of the rectifier may be maintained to be equal to or larger than the third voltage value $V_0$ predetermined for the output of the converter. Therefore, a voltage 920 at the output of the converter may also be maintained to be equal to or larger than the third voltage value $V_0$, that is, the threshold $V_{ref}$.

In step 830, the electronic device 401 receives power wirelessly and process the received power during a first time period $\Delta t_1$.

After the first time period has elapsed, the electronic device 401 determines whether the movement of the electronic device 401 is less than a threshold in step 840.

If the electronic device 401 determines that the movement is less than the threshold, the electronic device 401 sets the voltage setting value for the output of the rectifier to the first voltage value which is relatively small in step 850. That is, the electronic device 401 may change the voltage setting value for the output of the rectifier from the second voltage value to the first voltage value.

For example, in FIG. 9A, the electronic device 401 may determine whether its movement has been detected after the initial first time period 910 $\Delta t_1$ has elapsed. In this case, if the electronic device 401 determines that it is still moving, the electronic device 401 may maintain the voltage setting value for the output of the rectifier to be the second voltage value $V_2$. In this case, as indicated by a dotted line, a voltage 913 at the output of the rectifier may be the second voltage value $V_2$.

After the first time period $\Delta t_1$ elapses again, the electronic device 401 may determine again whether its movement has been detected.

After the first time period $\Delta t_1$ elapses again, if the electronic device 401 determines that the movement of the electronic device 401 is less than the threshold, the electronic device 401 may adjust the voltage setting value for the output of the rectifier to the first voltage value $V_1$. Accordingly, the voltage 912 at the output of the rectifier may be maintained to be the first voltage value $V_1$.

As illustrated in FIG. 9B, even when the electronic device 401 has moved, the electronic device 401 may determine whether its movement has been detected, each time the first time period $\Delta t_1$ elapses. If the electronic device 401 determines that no movement has been detected, the electronic device 401 may adjust the voltage setting value for the output of the rectifier to the first voltage value $V_1$. Therefore, a voltage 914 at the output of the rectifier may be maintained to be the first voltage value $V_1$.

In step 860, the electronic device 401 receives power wirelessly and process the received power according to a configured parameter.

Figure 10:
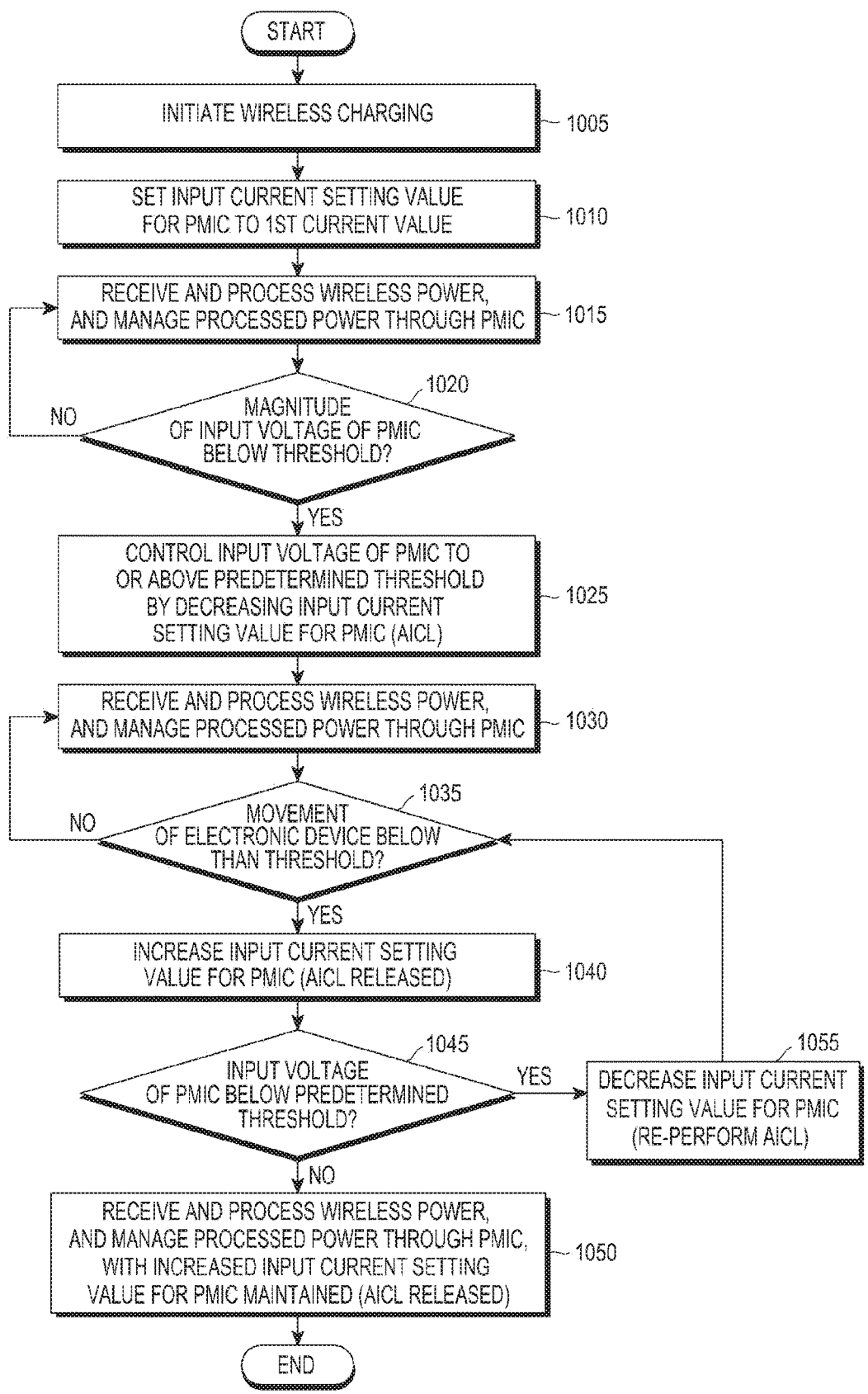
FIG. 10 is a flowchart illustrating a method for controlling an electronic device supporting automatic input current limit (AICL) according to an embodiment of the present disclosure.

FIG. 10 is a flowchart illustrating a method for controlling an electronic device supporting an AICL operation according to an embodiment of the present disclosure. FIG. 10 will be described in detail with reference to FIGS. 11 to 12C.

Figure 11:
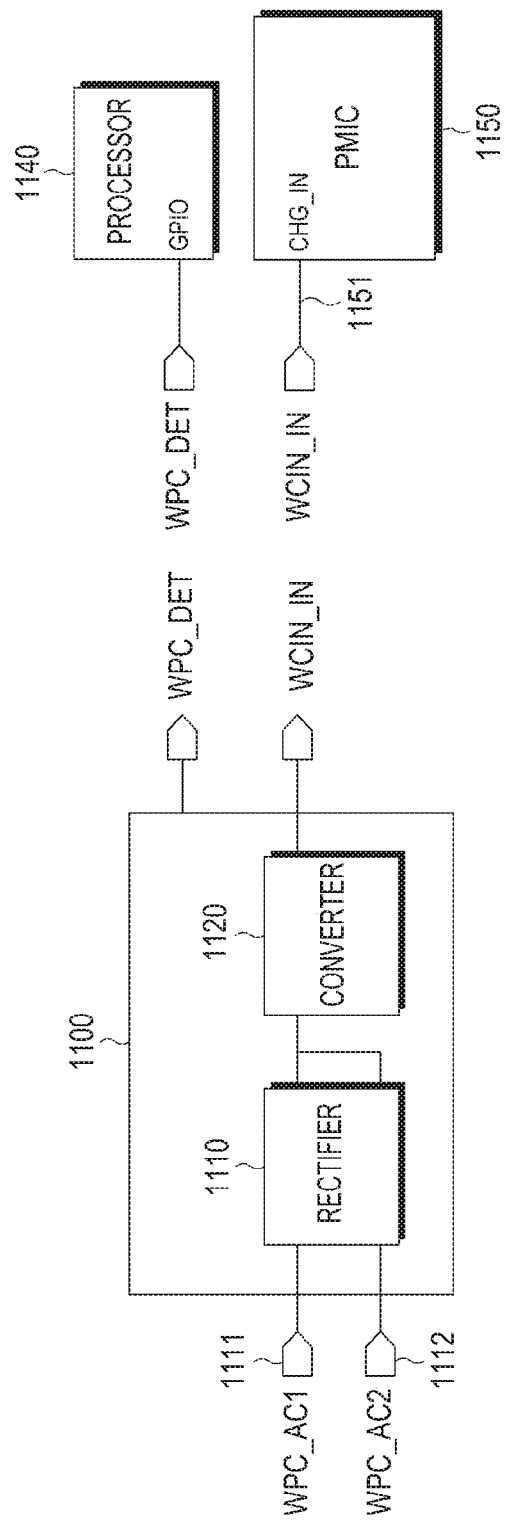
FIG. 11 illustrates an electronic device according to an embodiment of the present disclosure.
Figure 12A:
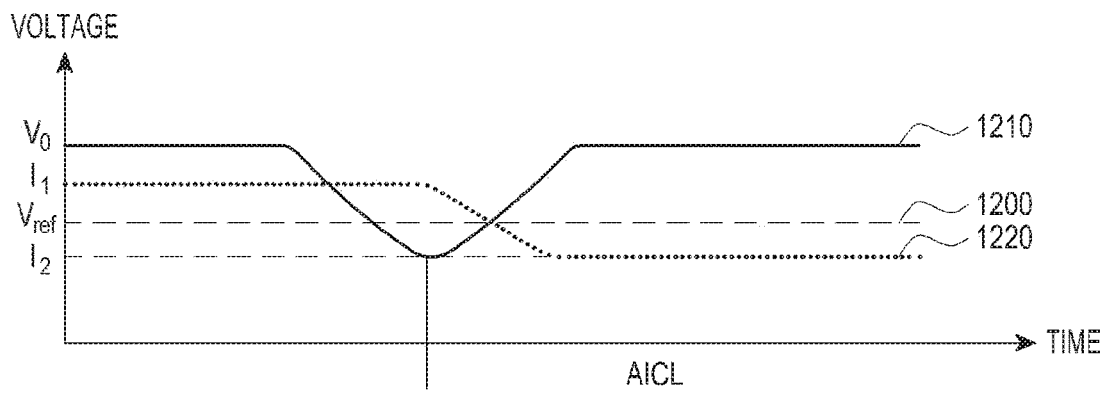
FIGS. 12A, 12B and 12C are graphs illustrating voltages and currents at various points of an electronic device according to an embodiment of the present disclosure.
Figure 12B:
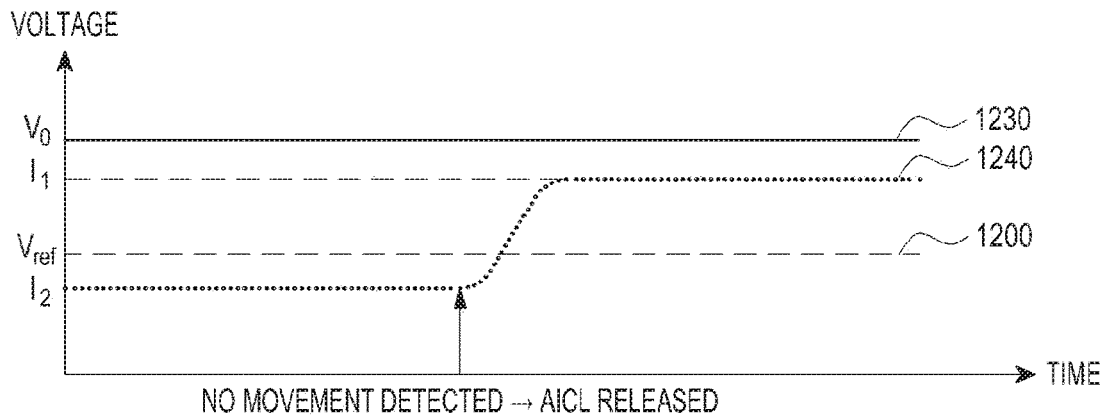
Figure 12C:
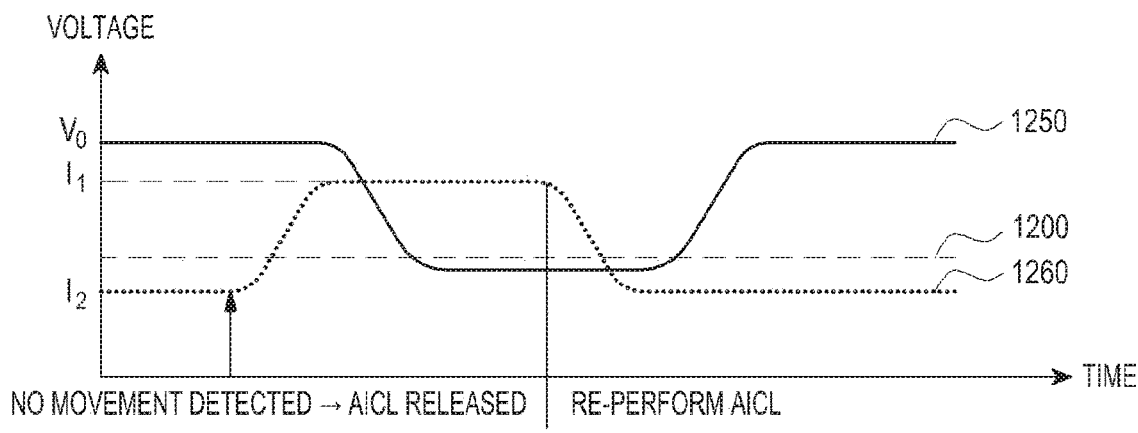

FIG. 11 illustrates an electronic device according to an embodiment of the present disclosure, and FIGS. 12A, 12B, and 12C are graphs illustrating voltages and currents at various points of an electronic device according to an embodiment of the present disclosure.

Referring to FIG. 10, in step 1005, the electronic device 401 initiates wireless charging. For example, as illustrated in FIG. 11, a processor 1140 of the electronic device 401 may detect the initiation of wireless charging, using a signal received through a WPC_DET terminal. A wireless power reception circuit 1100 may initiate wireless charging, and provide a signal related to the initiation of wireless charging to the WPC_DET terminal of the processor 1140 through a WPC_DET terminal of the wireless power reception circuit 1100. Signals input to and output from a WPC_DET terminal may be processed through general-purpose input/output (GPIO). The wireless power reception circuit 1100 includes a rectifier 1110 and a converter 1120. The converter 1120 may be configured as a low-dropout regulator (LDO). Two terminals, WPC_AC1 1111 and WPC_AC2 1112 are connected to the rectifier 1110. Coils for power reception are connected to the two terminals, WPC_AC1 1111 and WPC_AC2 1112, and thus, the rectifier 1110 may receive current in an AC waveform through the two terminals, WPC_AC1 1111 and WPC_AC2 1112. A voltage at an output of the rectifier 1110 may be denoted by $V_{RECT}$, and a voltage at an output of the converter 1120 may be denoted by $V_{LDO}$. The converter 1120 may provide converted power to a PMIC 1150 through a WCIN_IN terminal. The PMIC 1150 may receive the converted input power CHG_IN through a WCIN_IN terminal.

In step 1010, the electronic device 401 sets an input current setting value for the PMIC 1150 to a first current value. The PMIC 1150 may be configured as a charger for charging a battery.

For example, referring to FIG. 12A, the electronic device 401 may set the input current setting value for the PMIC 1150 to the first current value $I_1$. The first current value $I_1$ may be a relatively large value. Therefore, an input current 1220 of the PMIC 1150 may initially have the first current value $I_1$.

While current values and voltage values are shown on the same plane in FIGS. 12A, 12B, and 12C, for the sake of convenience, those skilled in the art will readily understand that current values and voltage values are physical quantities in different units.

Referring again to FIG. 10, the electronic device 401 receives power wirelessly, processes the received power, and manages the processed power through the PMIC 1150 in step 1015.

In step 1020, the electronic device 401 determines whether the magnitude of an input voltage 1210 of the PMIC 1150 is lower than the predetermined threshold $V_{ref}$. For example, the input voltage 1210 of the PMIC 1150, i.e., the output voltage $V_{LDO}$ of the converter 1120, may be dropped below the threshold $V_{ref}$ due to movement of the electronic device 401. If determining that the magnitude of the input voltage 1210 of the PMIC 1150 is lower than the predetermined threshold $V_{ref}$, the electronic device 401 controls the input voltage of the PMIC 1150 to be equal to or higher than the predetermined threshold by decreasing the input current setting value for the PMIC 1150 in step 1025.

As illustrated in FIG. 12A, the electronic device 401 may decrease the input current setting value for the PMIC 1150 to a second current value I2. Therefore, the input current 1220 of the PMIC 1150 may be decreased to the second current value $I_2$. In this case, as a current decreases at the input 1151 of the PMIC 1150, the voltage 1210 at the input 1151 may increase.

As described above, the operation of increasing a voltage value at the input 1151 of the PMIC 1150 by decreasing a current value at the input 1151 of the PMIC 1150 may be referred to as an AICL operation. That is, the electronic device 401 performs the AICL operation in step 1025.

In step 1030, the electronic device 401 receives power wirelessly, process the received power, and manage the processed power through the PMIC 1150. That is, the electronic device 401 may perform wireless charging with the input current of the PMIC 1150 decreased by the AICL operation. However, for example, if the PMIC 1150 charges the battery, the decrease of the input current may lengthen a charging time for the battery.

In step 1035, the electronic device 401 determines whether its movement is less than a threshold.

If determining that the movement of the electronic device 401 is less than the threshold, the electronic device 401 increases the input current setting value for the PMIC 1150 in step 1040. For example, as illustrated in FIG. 12B, the electronic device 401 may increase the input current setting value for the PMIC 1150, thereby increasing a current 1240 at the input 1151 of the PMIC 1150 to the first current value $I_1$. That is, in step 1040, the electronic device 401 may disable or release AICL.

In step 1045, the electronic device 401 determines whether an input voltage 1230 of the PMIC 1150 is lower than the predetermined threshold $V_{ref}$.

If determining that the input voltage 1230 of the PMIC 1150 is equal to or higher than the predetermined threshold $V_{ref}$, the electronic device 401 maintains the input current setting value for the PMIC 1150 to be the first current value $I_1$ in step 1050. That is, the electronic device 401 may maintain AICL disabled or released.

As illustrated in FIG. 12C, if an input voltage 1250 of the PMIC 1150 is lower than the predetermined threshold $V_{ref}$, the electronic device 401 may decrease the input current setting value for the PMIC 1150 to the second current value $I_2$ again in step 1055. Therefore, an input current 1260 of the PMIC 1150 may be decreased to the second current $I_2$. That is, if determining that the voltage value at the input 1151 of the PMIC 1150 is still below the threshold $V_{ref}$ in spite of detection of no movement, the electronic device 401 may perform the AICL operation again.

As described above, if determining that no movement has been detected during the AICL operation, the electronic device 401 may increase again the input current setting value for the PMIC which has been decreased by the AICL operation, thereby enabling fast battery charging according to various embodiments of the present disclosure.

Alternatively, the electronic device 401 may first decrease the input current setting value for the PMIC 1150 to the second current value $I_2$ by performing the AICL operation. Then, if determining that a predetermined time period has elapsed, the electronic device 401 may increase the decreased input current setting value for the PMIC 1150 to the first current value $I_1$ again. That is, if the predetermined time period has elapsed after the AICL operation, the electronic device 401 may disable or release AICL.

After disabling or releasing AICL, the electronic device 401 may measure an input voltage of the PMIC 1150 again. If determining that the input voltage of the PMIC 1150 is equal to or higher than the predetermined threshold, the electronic device 401 may maintain the increased input current setting value for the PMIC 1150. That is, if determining that the input voltage of the PMIC 1150 is equal to or higher than the predetermined threshold, the electronic device 401 may maintain AICL disabled or released. However, if determining that the input voltage of the PMIC 1150 is lower than the predetermined threshold, the electronic device 401 may decrease the increased input current setting value for the PMIC 1150 to the second current value $I_2$ again. That is, if determining that the input voltage of the PMIC 1150 is still below the predetermined threshold, the electronic device 401 may perform the AICL operation again.

Figure 13:
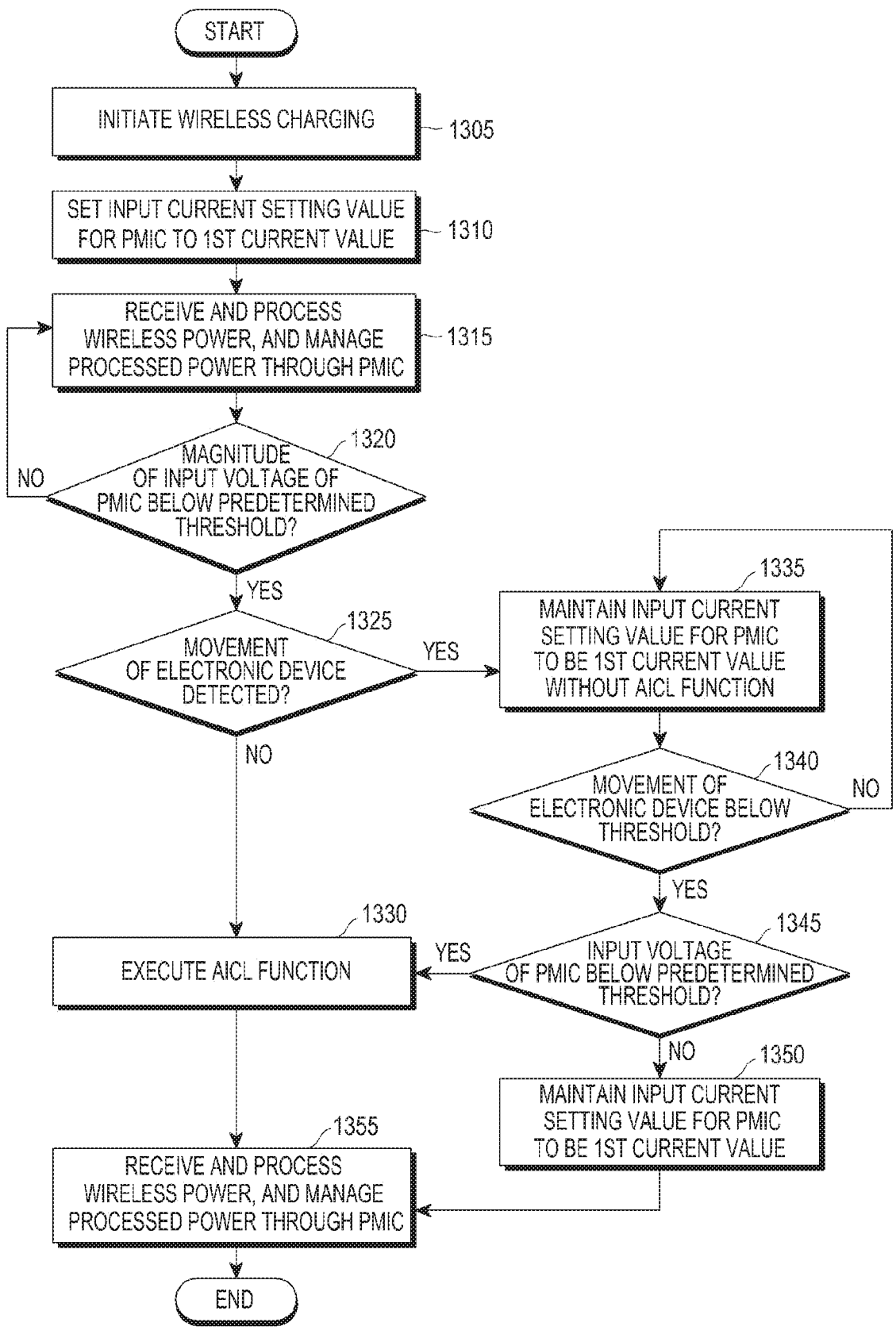
FIG. 13 is a flowchart illustrating a method for controlling an electronic device according to an embodiment of the present disclosure.

FIG. 13 is a flowchart illustrating a method for controlling an electronic device according to an embodiment of the present disclosure.

Referring to FIG. 13, in step 1305, the electronic device 401 initiates wireless charging. The electronic device 401 sets an input current setting value for the PMIC to a first current value which is relatively large in step 1310.

In step 1315, the electronic device 401 receives power wirelessly, processes the received power, and manages the processed power through the PMIC.

The electronic device 401 determines whether the magnitude of an input voltage of the PMIC is less than a predetermined threshold in step 1320. If determining that the magnitude of the input voltage of the PMIC is less than the predetermined threshold, the electronic device 401 determines whether its movement has been detected in step 1325. If determining that with no movement detected, the magnitude of the input voltage of the PMIC is less than the predetermined threshold, the electronic device 401 executes the AICL function in step 1330. That is, the electronic device 401 may increase the input voltage of the PMIC to or above the threshold by decreasing the input current setting value for the PMIC to a second current value which is relatively small.

However, if determining that with its movement detected, the magnitude of the input voltage of the PMIC is less than the predetermined threshold, the electronic device 401 maintains the input current setting value for the PMIC to be the first current value without executing the AICL function in step 1335.

In step 1340, the electronic device 401 determines whether the movement of the electronic device 401 is less than a threshold, that is, the movement has been discontinued. If determining that the movement is equal to or larger than the threshold, i.e., the movement is still going on, the electronic device 401 maintains the input current setting value for the PMIC to be the first current value, while holding execution without the AICL function in step 1335.

If determining that the movement of the electronic device 401 is less than the threshold, i.e., the movement has been discontinued, the electronic device 401 determines again whether the magnitude of the input voltage of the PMIC is smaller than the predetermined threshold in step 1345. If determining that the magnitude of the input voltage of the PMIC is smaller than the predetermined threshold, the electronic device 401 executes the AICL function in step 1330.

However, if determining that the magnitude of the input voltage of the PMIC is equal to or larger than the predetermined threshold, the electronic device 401 maintains the input current setting value for the PMIC to be the first current value in step 1350. If determining that the magnitude of the input voltage of the PMIC is smaller than the predetermined threshold, the electronic device 401 executes the AICL function in step 1350. In step 1355, the electronic device 401 receives power wirelessly, process the received power, and manage the processed power through the PMIC.

As described above, even though the magnitude of an input voltage of the PMIC is less than a threshold, upon detection of its movement, the electronic device 401 may hold the AICL operation.

Figure 14:
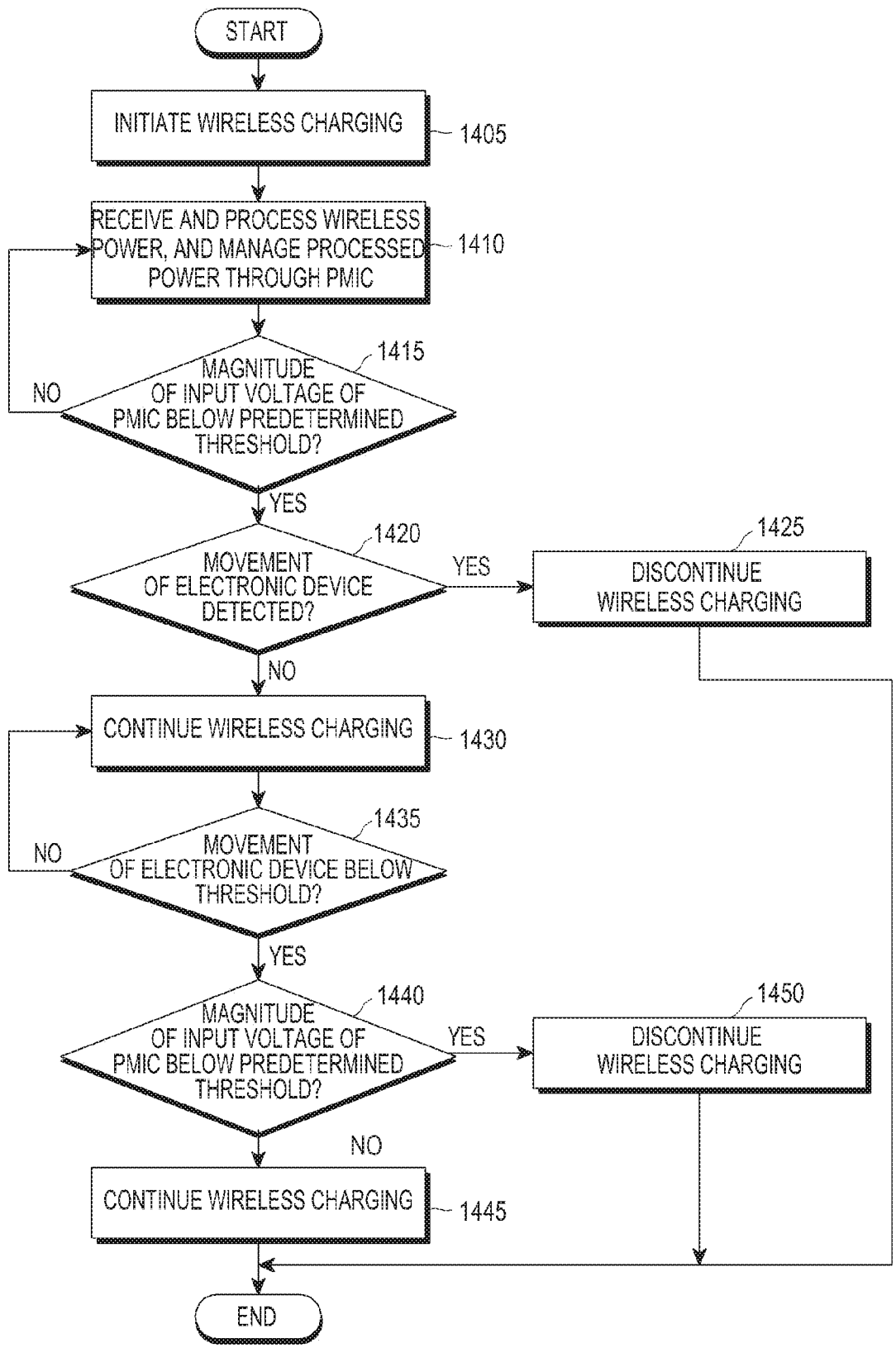
FIG. 14 is a flowchart illustrating a method for controlling an electronic device according to an embodiment of the present disclosure.

FIG. 14 is a flowchart illustrating a method for controlling an electronic device according to an embodiment of the present disclosure. In the method of FIG. 14, the electronic device may not support the AICL function. A legacy electronic device that does not support the AICL function may be configured to discontinue wireless charging, if determining that the magnitude of an input voltage of a PMIC is less than a predetermined threshold. Even though the magnitude of an input voltage of a PMIC is less than a predetermined threshold, upon detection of its movement, the electronic device 401 may first discontinue wireless charging. Hereinbelow, the afore-described operation of an electronic device will be described in greater detail.

Referring to FIG. 14, in step 1405, the electronic device 401 initiates wireless charging. The electronic device 401 receives power wirelessly, processes the received power, and manages the processed power through the PMIC in step 1410. In step 1415, the electronic device 401 determines whether the magnitude of an input voltage of the PMIC is smaller than a predetermined threshold.

If the magnitude of the input voltage of the PMIC is smaller than the predetermined threshold, the electronic device 401 determines whether its movement has been detected in step 1420. If the magnitude of the input voltage of the PMIC is smaller than the predetermined threshold and no movement of the electronic device has been detected, the electronic device 401 discontinues the wireless charging in step 1425. Even though the magnitude of the input voltage of the PMIC is smaller than the predetermined threshold, upon detection of movement of the electronic device 401, the electronic device 401 continues the wireless charging in step 1430. That is, the electronic device 401 may hold discontinuation of the wireless charging.

In step 1435, the electronic device 401 determines whether the movement of the electronic device 401 is less than a threshold. If determining that the movement of the electronic device 401 is less than the threshold, the electronic device 401 determines again whether the magnitude of the input voltage of the PMIC is smaller than the predetermined threshold in step 1440. If determining that the magnitude of the input voltage of the PMIC is equal to or larger than the predetermined threshold, the electronic device 401 continues the wireless charging in step 1445. However, even though the movement is discontinued, if determining that the magnitude of the input voltage of the PMIC is smaller than the predetermined threshold, the electronic device 401 discontinues the wireless charging in step 1450.

Figure 15A:
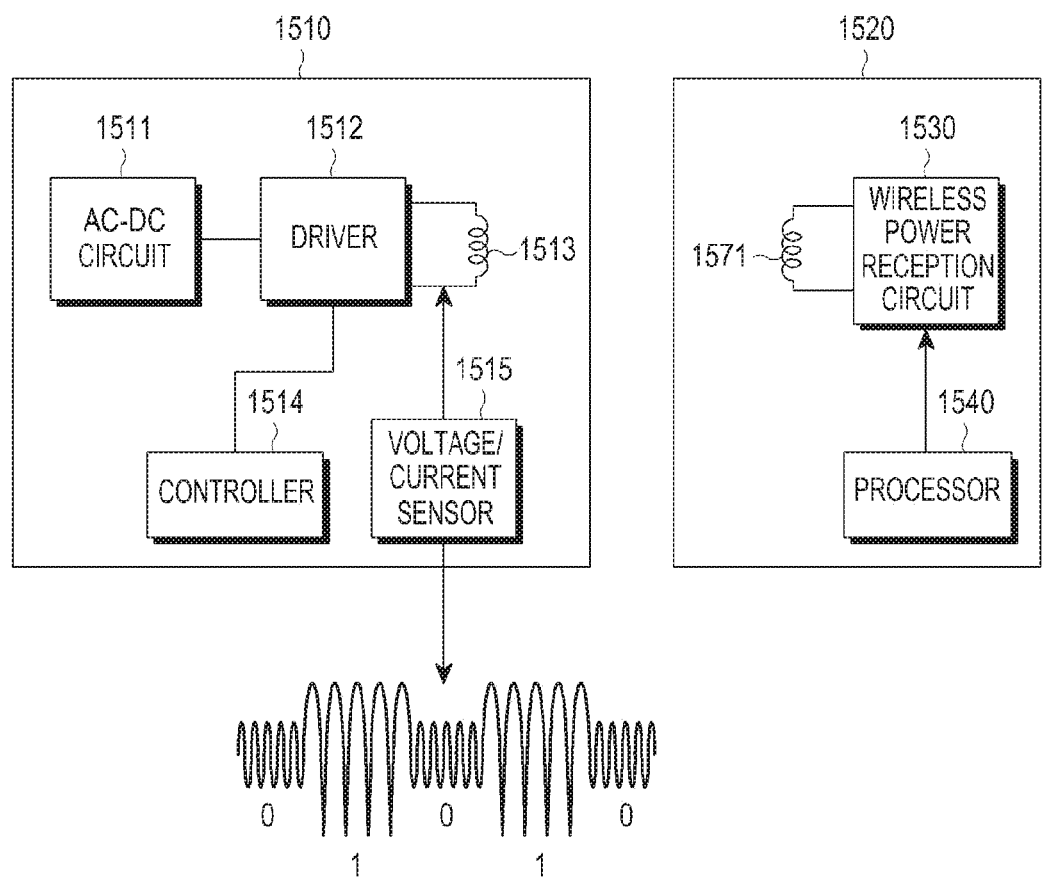
FIGS. 15A, 15B, and 15C illustrate in-band communication according to various embodiments of the present disclosure.
Figure 15B:
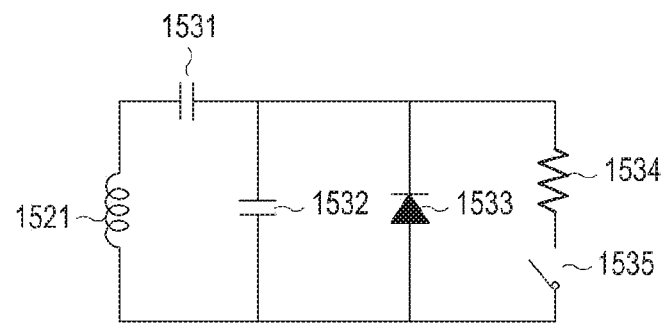
Figure 15C:
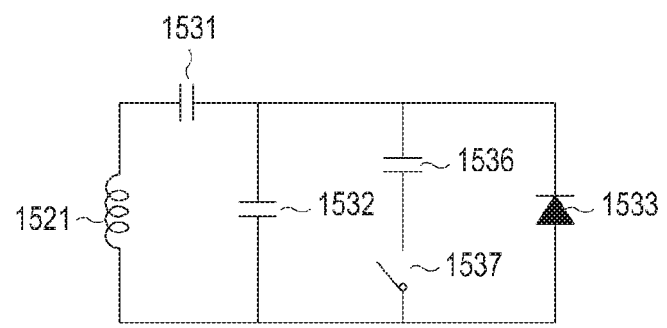

FIGS. 15A, 15B, and 15C illustrate in-band communication according to an embodiment of the present disclosure.

Referring to FIG. 15A, a wireless power transmitter 1510 includes an AC-DC circuit 1511, a driver 1512, a coil 1513, a controller 1514, and a voltage/current sensor 1515. An electronic device 1520 includes a coil 1571, a wireless power reception circuit 1530, and a processor 1540.

The AC-DC circuit 1511 may convert power in the DC waveform to the AC waveform and output the power in the AC waveform to the driver 1512. The driver 1512 may supply the received power to the coil 1513. The coil 1513 may supply the power wirelessly to the coil 1571 of the electronic device 1520, that is, a secondary side coil. The wireless power reception circuit 1530 may rectify the received power in the AC waveform to the DC waveform, convert the rectifier power, or regulate the converted power. The wireless power reception circuit 1530 may include a communication interface for in-band communication. For example, the wireless power reception circuit 1530 may include a communication interface illustrated in FIG. 15B or 15C.

Referring to FIG. 15B, the communication interface includes a resistor 1534 connected to the rectifier 1533, and a switch 1535. Capacitors 1531 and 1532 may be connected to the coil 1521, and the capacitors 1531 and 1532 and the coil 1521 may form, e.g., a resonant circuit having a resonant frequency configured by the WPC standard. The processor 1540 may control on/off of the switch 1535. If the switch 1535 is in the on state, the resistor 1534 may be connected to the coil 1521, and if the switch 1535 is in the off state, the resistor 1534 may not be connected to the coil 1521. The coils 1510 and 1521 may be coupled with each other. Thus, the impedance of the electronic device 1520 at the coil 1521 may be changed depending on whether the resistor 1534 is connected to the coil 1521.

Under the control of the processor 1540, the switch 1535 may be transitioned between a connected state, a disconnected state, the connected state, the disconnected state, the connected state, and so on.

As illustrated in the graph of FIG. 15A, the result of measuring a voltage or current of the coil 1513 by the voltage/current sensor 1515 may be equivalent to alternation between a relatively small amplitude and a relatively large amplitude. The controller 1514 may interpret information that the processor 1540 has intended to transmit by interpreting the amplitudes.

In FIG. 15C, the communication interface may include a switch 1537 and a capacitor 1536. However, if the electronic device 401 moves during the afore-described communication, a magnitude change may become large and thus the input voltage of a PMIC of the electronic device 1520 may be dropped below an undervoltage lock-out (UVLO).

Upon detection of movement of the electronic device 1520, the electronic device 1520 may hold communication, which will be described in more detail with reference to FIG. 16.

Figure 16:
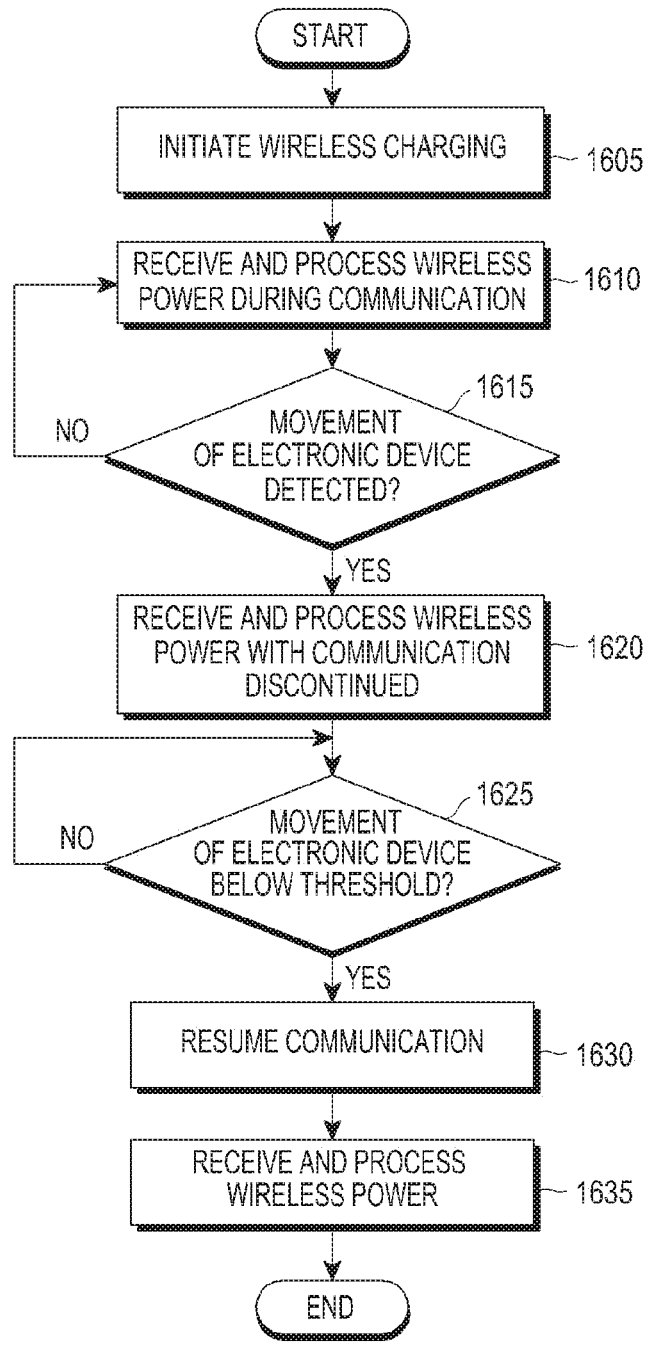
FIG. 16 is a flowchart illustrating a method for controlling an electronic device according to an embodiment of the present disclosure.

FIG. 16 is a flowchart illustrating a method for controlling an electronic device according to an embodiment of the present disclosure.

Referring to FIG. 16, in step 1605, the electronic device 401 initiates wireless charging. The electronic device 401 receives power wirelessly and processes the received power during communication in step 1610. For example, the electronic device 401 may conduct on/off keying communication by controlling the on/off state of the switch 1535 or 1537 in FIG. 15B or FIG. 15C, respectively.

In step 1615, the electronic device 401 determines whether its movement has been detected.

Upon detection of the movement of the electronic device 401, the electronic device 401 receives power wirelessly and processes the received power, with the communication discontinued in step 1620.

Accordingly, an influence that a communication-incurred magnitude change has may be mitigated, thereby preventing a voltage at the input of the PMIC of the electronic device 401 from dropping below the UVLO.

Alternatively, the electronic device 401 may conduct communication notifying a wireless power transmitter of discontinuation of the communication during a predetermined time period. That is, the electronic device 401 may control the on/off state of the switch in the communication interface by controlling the communication interface such that the communication interface may transmit a signal including information indicating communication discontinuation. The wireless power transmitter may continue the wireless charging for the electronic device 401 by detecting the communication signal.

In step 1625, the electronic device 401 determines whether the movement of the electronic device 401 is less than a threshold. If determining that the movement of the electronic device 401 is less than the threshold, the electronic device 401 resumes the communication in step 1630. In step 1635, the electronic device 401 receives power wirelessly and process the received power.

Even though a voltage at the input of the PMIC is decreased below the ULVO, the electronic device 401 may continue communication while the movement of the electronic device 401 is detected.

In accordance with an embodiment of the present disclosure, a method is provided for controlling an electronic device. The method includes detecting movement of the electronic device, receiving power wirelessly, rectifying the power by a rectifier, converting a voltage of the rectified power to a predetermined output voltage, charging a battery of the electronic device or supplying consumption power to at least one hardware component of the electronic device, using the converted power by a PMIC, and controlling a parameter for at least one of the rectifier or the PMIC, based on the movement of the electronic device.

The control of a parameter for at least one of the rectifier or the PMIC, based on the movement of the electronic device may include, if the movement of the electronic device is less than a predetermined threshold, setting a voltage setting value for an output of the rectifier to a first voltage value, or if the movement of the electronic device is equal to or larger than the predetermined threshold, setting the voltage setting value for the output of the rectifier to a second voltage value.

A first difference between the first voltage value and the predetermined output voltage may be smaller than a second difference between the second voltage value and the predetermined output voltage.

The control of a parameter for at least one of the rectifier or the PMIC, based on the movement of the electronic device may include monitoring movement of the electronic device, during reception of the power with the voltage setting value for the output of the rectifier set to the second voltage value based on the determination that the movement of the electronic device is equal to or larger than the predetermined threshold, and if it is detected that the movement of the electronic device is decreased below the predetermined threshold, changing the voltage setting value for the output of the rectifier from the second voltage value to the first voltage value.

The control of a parameter for at least one of the rectifier or the PMIC, based on the movement of the electronic device may include, if it is determined that a voltage at an input of the PMIC is lower than a predetermined voltage threshold, decreasing an input current setting value for the PMIC from a first current value to a second current value smaller than the first current value, and if with the input current setting value for the PMIC set to the second current value, it is determined that the movement of the electronic device is less than a predetermined threshold, changing the input current setting value for the PMIC from the second current value to the first current value.

The control of a parameter for at least one of the rectifier or the PMIC, based on the movement of the electronic device may include setting an input current setting value for the PMIC to a first current value, and if it is determined that a voltage at an input of the PMIC is lower than a predetermined voltage threshold and the movement of the electronic device is equal to or larger than a predetermined threshold, maintaining the input current setting value for the PMIC to be the first current value.

The control of a parameter for at least one of the rectifier or the PMIC, based on the movement of the electronic device may include continuing the reception of the power, if it is determined that a voltage at an input of the PMIC is lower than a predetermined voltage threshold and the movement of the electronic device is equal to or larger than a predetermined threshold.

The method may further include communicating with a wireless power transmitter transmitting the power wirelessly, and the control of a parameter for at least one of the rectifier or the PMIC, based on the movement of the electronic device may include, if it is determined that a voltage at an input of the PMIC is lower than a predetermined voltage threshold and the movement of the electronic device is equal to or larger than a predetermined threshold, discontinuing the communication with the wireless power transmitter.

The method for controlling an electronic device may further include communicating with a wireless power transmitter transmitting the power wirelessly, and the control of a parameter for at least one of the rectifier or the PMIC, based on the movement of the electronic device may include discontinuing the communication with the wireless power transmitter, if it is determined that a voltage at an input of the PMIC is lower than a predetermined voltage threshold and the movement of the electronic device is equal to or larger than a predetermined threshold.

The control of a parameter for at least one of the rectifier or the PMIC, based on the movement of the electronic device may further include transmitting a signal including information indicating communication discontinuation to the wireless power transmitter, before the communication with the wireless power transmitter is discontinued.

The control of a parameter for at least one of the rectifier or the PMIC, based on the movement of the electronic device may further include resuming the communication with the wireless power transmitter, if it is determined that the movement of the electronic device is decreased below the predetermined threshold.

The control of a parameter for at least one of the rectifier or the PMIC, based on the movement of the electronic device may include, upon detection of initiation of wireless reception of the power, setting the voltage setting value for the output of the rectifier to a second voltage value larger than a first voltage value, and if it is detected that the movement of the electronic device is decreased below a predetermined threshold, changing a voltage setting value for an output of the rectifier from the second voltage value to the first voltage value.

The control of a parameter for at least one of the rectifier or the PMIC, based on the movement of the electronic device may include, upon detection of the initiation of wireless reception of the power, setting the voltage setting value for the output of the rectifier to the second voltage value larger than the first voltage value during a first time period, and if the first time period elapses, detecting movement of the electronic device again.

According to various embodiments of the present disclosure, a storage medium may store instructions configured to, when executed by at least one processor, control the at least one processor to perform at least one operation. The at least one operation may include detecting movement of an electronic device, receiving power wirelessly, rectifying the power by a rectifier, converting a voltage of the rectified power to a predetermined output voltage, charging a battery of the electronic device or supplying consumption power to at least one hardware component of the electronic device, using the converted power by a PMIC, and controlling a parameter for at least one of the rectifier or the PMIC, based on the movement of the electronic device.

As described above, an electronic device and a method for controlling the electronic device can perform wireless charging reliably, by adjusting various parameters for a wireless power reception circuit, a built-in PMIC, or a charger of the electronic device based on movement of the electronic device. Therefore, the reliability of wireless charging can be increased.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a sensor configured to detect movement of the electronic device;
   a coil configured to receive power wirelessly;
   a rectifier configured to rectify the power received from the coil;
   a converter configured to convert a voltage of the rectified power to an output voltage;
   a power management integrated circuit (PMIC) configured to charge a battery of the electronic device or supply power to at least one hardware component of the electronic device, using the converted power; and
   a processor configured to control a parameter for the rectifier based on the movement of the electronic device,
   wherein the processor is further configured to set the output of the rectifier to a second predetermined voltage value which is larger than a first predetermined voltage value upon detection of initiation of wireless reception of the power; and wherein the processor is further configured to change the output of the rectifier from the second predetermined voltage value to the first predetermined voltage value if the processor detects that a movement of the electronic device has decreased below a predetermined movement threshold.

2. The electronic device of claim 1, wherein the processor is further configured to control the parameter of the rectifier by setting the output of the rectifier to the second predetermined voltage value when the movement of the electronic device is less than the predetermined movement threshold and by setting the output of the rectifier to the first predetermined voltage value when the movement of the electronic device is equal to or larger than the predetermined movement threshold.

3. The electronic device of claim 2, wherein a first difference between the second predetermined voltage value and the output voltage of the converter is smaller than a second difference between the first predetermined voltage value and the output voltage of the converter.

4. The electronic device of claim 2, wherein the processor is further configured to monitor the movement of the electronic device during reception of the power with the output of the rectifier set to the first predetermined voltage value based on the determination that the movement of the electronic device is equal to or larger than the predetermined movement threshold; and wherein the processor is further configured to change the output for the output of the rectifier from the first predetermined voltage value to the second predetermined voltage value, if the processor detects that the movement of the electronic device has decreased below the predetermined movement threshold.

5. The electronic device of claim 1, wherein the processor is further configured to set the output of the rectifier to the second predetermined voltage value, which is larger than the first predetermined voltage value, during a first time period, upon detection of the initiation of wireless reception of the power; and wherein the processor is further configured to detect the movement of the electronic device again, if the first time period elapses.

6. The electronic device of claim 1, wherein the processor is further configured to decrease an input current setting value for the PMIC from a first current value to a second current value, which is smaller than the first current value, if the processor determines that a voltage at an input of the PMIC is lower than a predetermined voltage threshold; and wherein the processor is further configured change the input current setting value for the PMIC from the second current value to the first current value, if with the input current setting value for the PMIC set to the second current value and the processor determines that the movement of the electronic device is less than the predetermined movement threshold.

7. The electronic device of claim 1, wherein the processor is further configured to set an input current setting value for the PMIC to a first current value; and wherein the processor is further configured to maintain the input current setting value for the PMIC to be the first current value, if the processor determines that a voltage at an input of the PMIC is lower than a predetermined voltage threshold and the movement of the electronic device is equal to or larger than the predetermined movement threshold.

8. The electronic device of claim 1, wherein the processor is further configured to continue the reception of the power, if the processor determines that a voltage at an input of the PMIC is lower than a predetermined voltage threshold and the movement of the electronic, device is equal to or larger than the predetermined movement threshold.

9. The electronic device of claim 1, further comprising a communication interface configured to communicate with a wireless power transmitter transmitting the power wirelessly, wherein the processor is further configured to control the communication interface to discontinue the communication with the wireless power transmitter, if the processor determines that a voltage at an input of the PMIC is lower than a predetermined voltage threshold and the movement of the electronic device is equal to or larger than the predetermined movement threshold.

10. The electronic device of claim 9, wherein the processor is further configured to control the communication interface to transmit a signal including information indicating communication discontinuation to the wireless power transmitter, before the communication interface discontinues the communication with the wireless power transmitter.

11. The electronic device of claim 9, wherein the processor is further configured to control the communication interface to resume the communication with the wireless power transmitter, if the processor determines that the movement of the electronic device has decreased below the predetermined movement threshold.

12. A method for controlling an electronic device, the method comprising:

detecting movement of the electronic device;
receiving power wirelessly;
rectifying the power by a rectifier;
converting a voltage of the rectified power to an output voltage;
charging, by a power management integrated circuit (PMIC), a battery of the electronic device or supplying power to at least one hardware component of the electronic device, using the converted power; and
controlling a parameter for the rectifier based on the movement of the electronic device,
wherein controlling the parameter for the rectifier comprises:
setting an output of the rectifier to a second predetermined voltage value which is larger than a first predetermined voltage value upon detection of initiation of wireless reception of the power; and
changing the output of the rectifier from the second predetermined voltage value to the first predetermined voltage value if movement of the electronic device has decreased below a predetermined movement threshold.

13. The method of claim 12, wherein controlling the parameter for the rectifier comprises:

in response to the movement of the electronic device being equal to or larger than the predetermined movement threshold, setting the output of the rectifier to the first predetermined voltage value; and in response to the movement of the electronic device being equal to or larger than the predetermined movement threshold, setting the output of the rectifier to the second predetermined voltage value.

14. The method of claim 13, wherein a first difference between the second predetermined voltage value and a predetermined output voltage is smaller than a second difference between the first predetermined voltage value and a predetermined output voltage.

15. The method of claim 13, wherein controlling the parameter for the rectifier comprises:
monitoring movement of the electronic device, during reception of the power with the output of the rectifier set to the first predetermined voltage value based on the determination that the movement of the electronic device is equal to or larger than the predetermined movement threshold; and
in response to the movement of the electronic device being decreased below the predetermined moving threshold, changing the output of the rectifier from the first predetermined voltage value to the second predetermined voltage value.

16. The method of claim 12, wherein controlling the parameter for the rectifier comprises:
in response to a voltage at an input of the PMIC being lower than a predetermined voltage threshold, decreasing an input current setting value for the PMIC from a first current value to a second current value which is smaller than the first current value; and
in response to the movement of the electronic device being less than a predetermined threshold while the input current setting value for the PMIC set to the second current value, changing the input current setting value for the PMIC from the second current value to the first current value.

17. The method of claim 12, wherein controlling the parameter for the rectifier comprises:
setting an input current setting value for the PMIC to a first current value; and
in response to a voltage at an input of the PMIC being lower than a predetermined voltage threshold and the movement of the electronic device is equal to or larger than the predetermined movement threshold, maintaining the input current setting value for the PMIC to be the first current value.

18. The method of claim 12, wherein controlling the parameter for the rectifier comprises:
in response to a voltage at an input of the PMIC being lower than a predetermined voltage threshold and the movement of the electronic device is equal to or larger than the predetermined movement threshold, continuing the reception of the power.

19. The method of claim 12, further comprising communicating with a wireless power transmitter transmitting the power wirelessly,
wherein controlling the parameter for the rectifier includes, in response to a voltage at an input of the PMIC being lower than a predetermined voltage threshold and the movement of the electronic device is equal to or larger than the predetermined movement threshold, discontinuing the communication with the wireless power transmitter.

* * * * *